US012650903B2

(12) United States Patent
Pogde et al.

(10) Patent No.: US 12,650,903 B2
(45) Date of Patent: Jun. 9, 2026

(54) SNAPSHOTS FOR DISTRIBUTED OBJECT-BASED DATASTORES

(71) Applicant: Cloudera, Inc., Santa Clara, CA (US)

(72) Inventors: Prashant Pogde, Sunnyvale, CA (US); Siddharth Wagle, Saratoga, CA (US); Nandakumar Vadivelu, Bangalore (IN); Mukul Kumar Singh, Bangalore (IN)

(73) Assignee: CLOUDERA, INC., Santa Clara, CA (US)

( * ) Notice: Subject to any disclaimer, the term of this patent is extended or adjusted under 35 U.S.C. 154(b) by 38 days.

(21) Appl. No.: 18/325,825

(22) Filed: May 30, 2023

(65) Prior Publication Data

US 2023/0385304 A1 Nov. 30, 2023

Related U.S. Application Data

(60) Provisional application No. 63/408,058, filed on Sep. 19, 2022, provisional application No. 63/347,492, filed on May 31, 2022.

(51) Int. Cl.
*G06F 11/1446* (2026.01)
*G06F 16/11* (2019.01)
(Continued)

(52) U.S. Cl.
CPC ........ *G06F 11/1458* (2013.01); *G06F 16/122* (2019.01); *G06F 16/134* (2019.01); *G06F 16/178* (2019.01); *G06F 16/1844* (2019.01); *G06F 16/27* (2019.01); *G06F 2201/84* (2013.01)

(58) Field of Classification Search
CPC .. G06F 11/1458; G06F 16/27; G06F 16/1844; G06F 16/122; G06F 16/178; G06F 16/134; G06F 2201/84
See application file for complete search history.

(56) References Cited

U.S. PATENT DOCUMENTS

| | | | | |
|---|---|---|---|---|
| 7,523,277 B1 * | 4/2009 | Kekre | ................. | G06F 11/1666 711/167 |
| 11,099,956 B1 * | 8/2021 | Polimera | ............. | G06F 11/2069 |

(Continued)

*Primary Examiner* — Khanh B Pham
*Assistant Examiner* — Faezeh Forouharnejad
(74) *Attorney, Agent, or Firm* — PERKINS COIE LLP

(57) ABSTRACT

Snapshot or point-in-time image functionality improves the use of object-based datastores. An example system includes an object-based datastore and a metadata datastore associated with the object-based datastore. Instances of the metadata datastore each identify the distributed data blocks that respectively store the objects included in the object-based datastore. An instance of the metadata datastore is used as a snapshot image of a set of objects of the object-based datastore based on identifying the distributed data blocks that were mapped to the set of objects during a point in time. A different instance of the metadata datastore is dynamically updated to reflect present mappings of distributed data blocks to objects in the object-based datastore. Different instances of the metadata datastore are used to read objects from previous timepoints, restore the object-based datastore to a previous snapshot image, enable intelligent deletion of objects of the object-based data store, and more.

20 Claims, 9 Drawing Sheets

(51) Int. Cl.
    *G06F 16/13*         (2019.01)
    *G06F 16/178*      (2019.01)
    *G06F 16/182*      (2019.01)
    *G06F 16/27*       (2019.01)

(56)         References Cited

U.S. PATENT DOCUMENTS

| | | | |
|---|---|---|---|
| 2016/0275094 A1* | 9/2016 | Lipcon | G06F 16/278 |
| 2018/0096045 A1* | 4/2018 | Merriman | G06F 16/273 |
| 2019/0361842 A1* | 11/2019 | Wood | G06V 30/418 |
| 2020/0201821 A1* | 6/2020 | Wang | G06F 16/13 |
| 2021/0004352 A1* | 1/2021 | Rawal | G06F 16/128 |
| 2023/0195576 A1* | 6/2023 | Xiang | G06F 11/1474 |
| | | | 714/15 |

\* cited by examiner

100

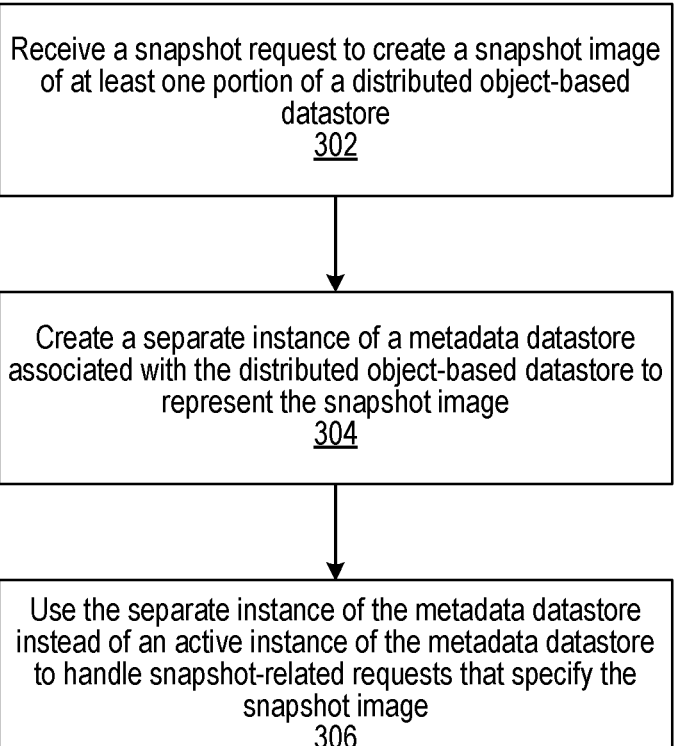

Receive a snapshot request to create a snapshot image of at least one portion of a distributed object-based datastore
302

Create a separate instance of a metadata datastore associated with the distributed object-based datastore to represent the snapshot image
304

Use the separate instance of the metadata datastore instead of an active instance of the metadata datastore to handle snapshot-related requests that specify the snapshot image
306

*FIG. 3*

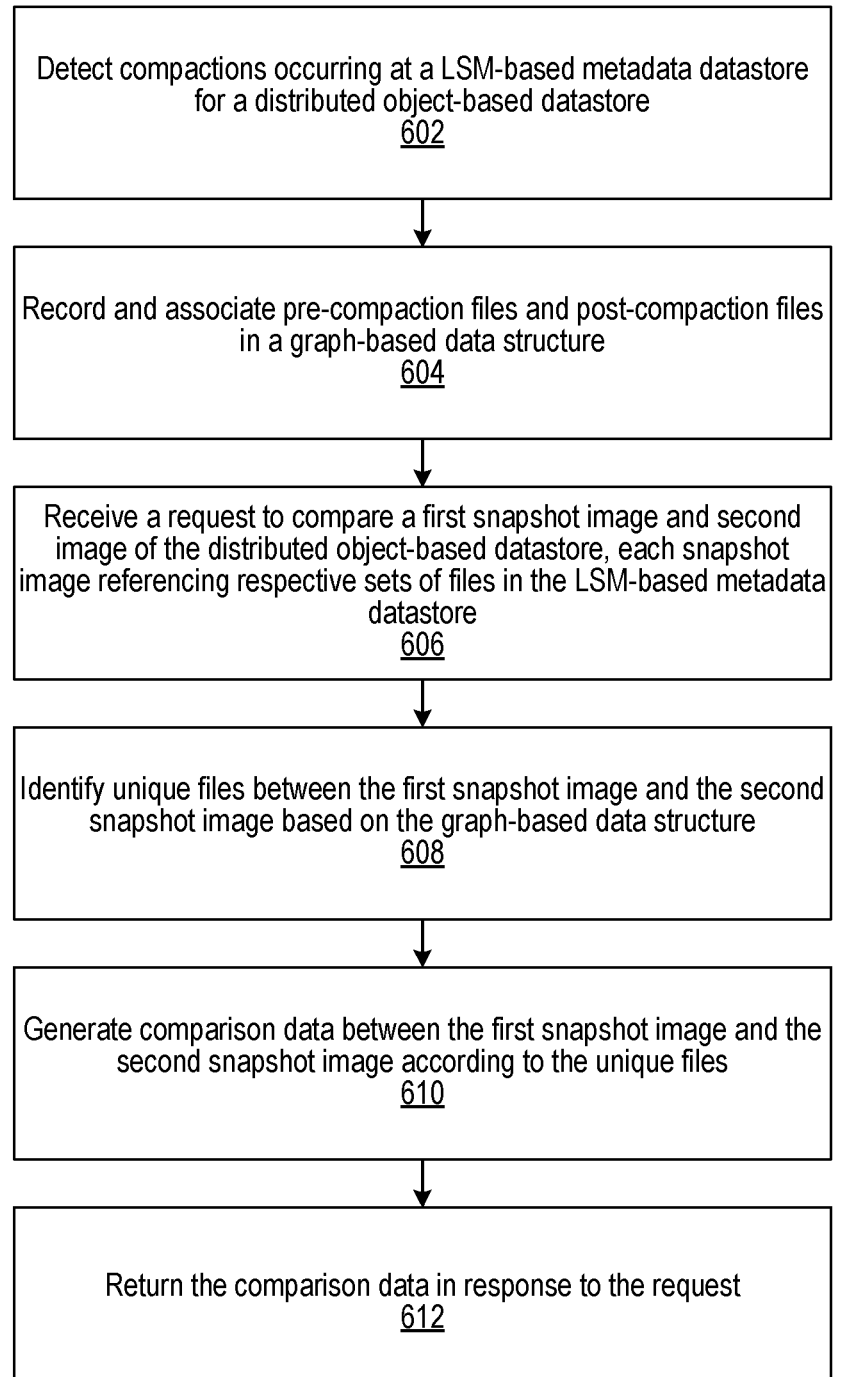

Detect compactions occurring at a LSM-based metadata datastore
for a distributed object-based datastore
602

Record and associate pre-compaction files and post-compaction files
in a graph-based data structure
604

Receive a request to compare a first snapshot image and second
image of the distributed object-based datastore, each snapshot
image referencing respective sets of files in the LSM-based metadata
datastore
606

Identify unique files between the first snapshot image and the second
snapshot image based on the graph-based data structure
608

Generate comparison data between the first snapshot image and the
second snapshot image according to the unique files
610

Return the comparison data in response to the request
612

*FIG. 6*

SNAPSHOTS FOR DISTRIBUTED OBJECT-BASED DATASTORES

CROSS-REFERENCE TO RELATED APPLICATION(S)

This application claims priority to U.S. Provisional Application No. 63/347,492, titled "CHECKPOINT BASED SNAPSHOT FOR DISTRIBUTED DATA STORE" and filed May 31, 2022, and U.S. Provisional Application No. 63/408,058, titled "SNAPDIFF AND COMPACTION HANDLING" and filed Sep. 19, 2022. Each of the aforementioned applications are incorporated by referenced herein in their respective entireties.

BACKGROUND

Object-based data storage, as an alternative to other data storage systems such as file-based data storage, features improved scalability, with data objects being stored in relatively flat architecture. Yet, by providing scalable storage of millions, billions, and trillions of data objects, technical challenges exist with implementing snapshot or point-in-time image functionality for object-based data storage systems, and in particular, snapshot or point-in-time image functionality on a multi-object scale.

BRIEF DESCRIPTION OF THE DRAWINGS

FIG. 3 is a flow diagram that illustrates example operations for creating and using snapshots or point-in-time images for a distributed object-based datastore.

FIG. 6 is a flow diagram that illustrates example operations for robustly comparing snapshots or point-in-time images of a distributed object-based datastore.

DETAILED DESCRIPTION

Figure 1A:
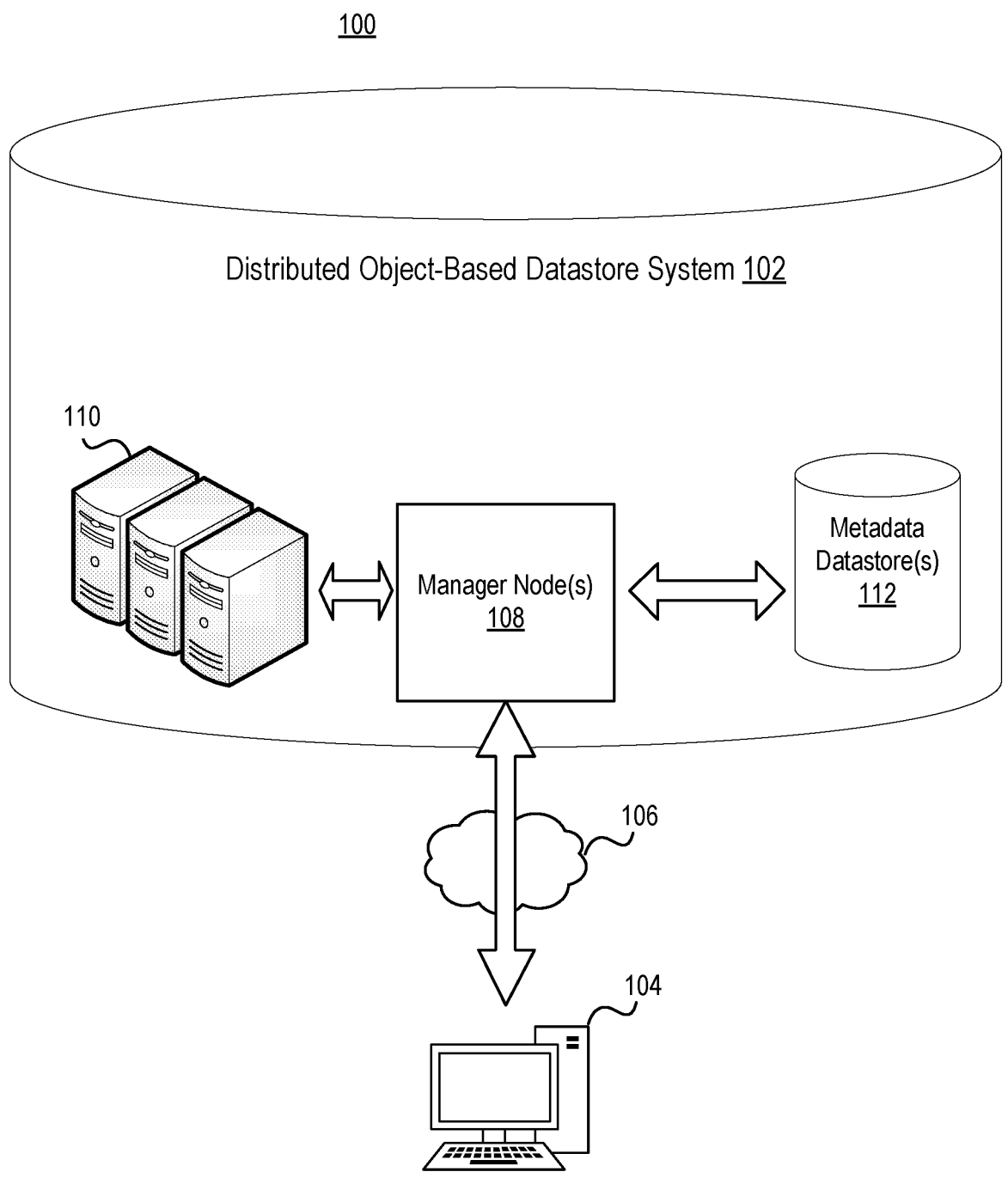
FIG. 1A is a diagram that illustrates an example of a distributed object-based datastore system in which the techniques described herein for snapshotting/imaging and snapshot comparison can be implemented.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

I. Example Implementations of Distributed Object-Based Datastore Systems

Disclosed herein are techniques for improving and enhancing distributed object-based datastore systems with snapshotting features and other snapshot-related features. Object-based data storage is a particular technical system or architecture that features improved scalability compared to other storage architectures, such as file-based data storage. According to object-based data storage, multiple data objects are stored in a relatively flat and unstructured hierarchy. In some examples of object-based datastores, the relatively flat hierarchy of a distributed object-based datastore can include data volumes at a top-level, and the data volumes can store one or more buckets that each store data objects. With the flat and unstructured hierarchy, a bucket can store billions of data objects.

In some examples, the data objects of an object-based data storage can be configured as key-value pairs, by which the data, contents, or values of a given data object are mapped or associated with a key or identifier for the given data object. The data/contents/values of a data object can be divided into data blocks or block portions that can be stored in and/or across distributed data nodes, and the distribution of the data blocks of a data object at/across specific data nodes is described in metadata for the distributed object-based datastore. For example, metadata information for the distributed object-based datastore can include, for a given data object, one or more network addresses (e.g., Internet Protocol (IP) addresses) or identifiers for data nodes at which the data blocks of the given data object are stored, and the one or more network addresses or identifiers can be mapped or associated with the object key of the given data object. Metadata information for the distributed object-based datastore can further include user access levels or permissions, creation/modification/deletion times, data size, and/or the like. Examples of distributed object-based datastore include Apache Ozone, MinIO, and Amazon S3.

FIG. 1A illustrates an example of an environment 100 that includes a distributed object-based datastore system 102. The environment 100 further includes a client system 104 that can interface with the distributed object-based datastore system 102 via a network 106. For example, the client system 104 can read/request data from the distributed object-based datastore system 102, write data to the distributed object-based datastore system 102, manipulate/modify data stored in the distributed object-based datastore system 102, and/or the like. In particular, the client system 104 can, via the network 106, communicate with one or more manager nodes 108 associated with the distributed object-based datastore system 102 in order to interface, access, and/or manipulate the data stored by the distributed object-based datastore system 102.

In some embodiments, the client system 104 includes a user interface via which a user can specify data objects, data buckets, data volumes, or generally portions of the distributed object-based datastore. For example, via the user interface (e.g., a command line interface), the user can define a path that specifies a name or identifier of a particular data volume, a name or identifier of a particular data bucket within a particular data volume, and/or an object key (e.g., a numerical identifier, a lexicographic identifier) of a particular data object. By defining a path via the user interface at the client system 104, the user can request access to portions or data objects of the distributed object-based datastore, manipulate or modify portions or data objects of the distributed object-based datastore, and more.

The distributed object-based datastore system 102 includes a plurality of data nodes 110 that implement the distributed object-based datastore. The plurality of data nodes 110 store data blocks that includes at least portions of the data, content, values, or the like of data objects included in the distributed object-based datastore. The manager nodes 108 are communicatively coupled with the plurality of data nodes 110 to perform operations related to the data stored and distributed across the data nodes 110.

According to example embodiments, modifications to data objects of the distributed object-based datastore involve, for a given data object, writing the modifications to new data blocks stored at the data nodes 110 and mapping an object key for the given data object to the new data blocks. The existing data blocks that recorded the previous or original data/content/values of the given data object can remain stored by the data nodes 110 for at least some time before a reclamation or cleaning process. In this way, previous versions or states of the given data object can be accessed based on identifying the data blocks previously mapped to the given data object's key (if the data blocks are still presently stored by the data nodes 110). For example, the data blocks at the data nodes 110, once written, are maintained in a read-only state.

The distributed object-based datastore system 102 further includes metadata datastores 112 that store metadata information related to the distributed object-based datastore implemented by the data nodes 110, and related to the data objects included in the distributed object-based datastore. In some embodiments, each of the metadata datastores 112 is implemented, included in, or communicatively coupled to a corresponding manager node 108. In some embodiments, a manager node 108 locally includes a metadata datastore 112. By doing so, the manager nodes 108, which are distributed across multiple systems, provide high availability of the distributed object-based datastore system 102 to client systems 104 interfacing with the manager nodes 108. For example, a client system 104 can communicate with any one of the manager nodes 108 for operations that rely upon metadata information of the distributed object-based datastore, and the one manager node that is communicated with can use its respective or local metadata datastore to process the operations without needing to communicate to a centralized metadata datastore or a metadata datastore located at another manager node, data node, or computing node.

In order to ensure consistency between different metadata datastores 112 and between request responses provided by different manager nodes 108, the distributed object-based datastore system 102 can implement a replication layer, consensus layer, and/or the like that is configured to propagate updates made to one metadata datastore to the other metadata datastores. In some examples, the replication/consensus layer uses a consensus protocol (e.g., the Raft consensus protocol) to communicate between metadata datastores 112 and manager nodes 108 and provide replication/consensus. Each manager node 108 is configured to participate, initiate, process, and/or execute replication/consensus transactions according to the consensus protocol via the replication/consensus layer.

According to example embodiments, a metadata datastore 112 is configured according to a log-structured merge-tree (LSM) architecture. According to an LSM-based structure of the metadata datastore 112, the metadata information recorded in the metadata datastore 112 are immutable. With the LSM-based structure, the metadata datastore 112 is an append-only database in which modifications to recorded information are appended as new entries, thus providing immutability of already-recorded information. In some embodiments, the metadata datastore 112 includes a plurality of metadata files, for example, configured as sorted string table files (SST files) on each of which the metadata information for objects included in the distributed object-based datastore are recorded. Another example of metadata files includes log files, such as write-ahead log files (WAL files). A given metadata file can record metadata information for a given set (or subset) of objects included in the distributed object-based datastore. For example, a metadata file records, for each of a set of object keys recently specified by user operations, new block mapping information, data values, and/or the like. The metadata datastore 112 is instantiable, and/or supports an ability to capture a point-in-time image of the metadata datastore in a separate directory. The metadata datastore 112 is also configured to perform compaction techniques to appropriately manage the size of the metadata datastore 112 based on compacting metadata files to larger and fewer files. Examples of databases that can be used to implement the metadata datastore 112 include RocksDB, Apache Cassandra, LevelDB, and/or other key-value datastores. In some embodiments, the metadata datastore 112 is a key-value datastore configured with a checkpoint feature, for example, based on an addition of a thin layer on top of the key-value datastore to quiesce the inputs/outputs and take a consistent checkpoint of the files within the key-value datastore using hard-links.

Figure 1B:
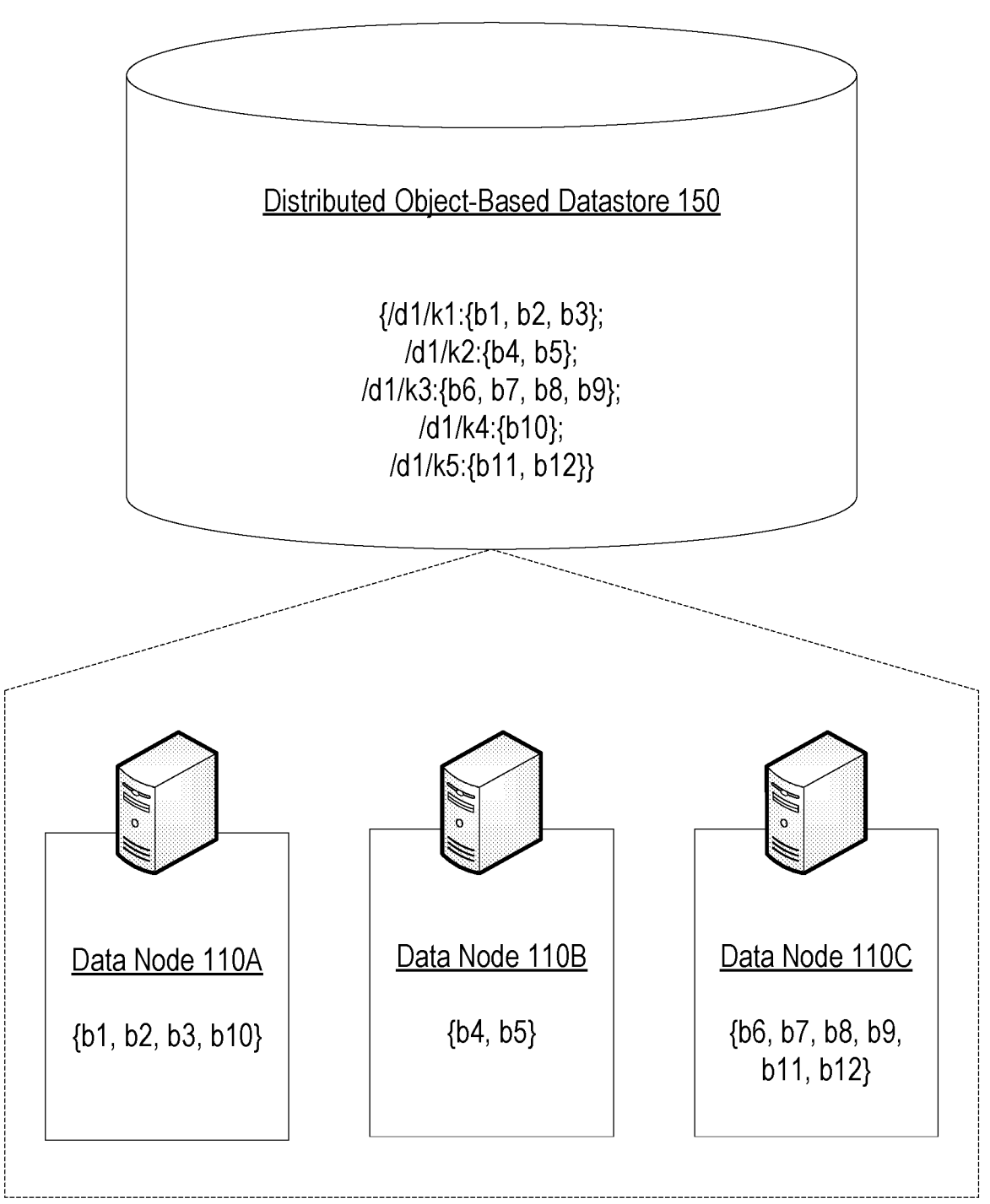
FIG. 1B is a diagram that illustrates an example of a distributed object-based datastore implemented across multiple data nodes.

FIG. 1B is a diagram that demonstrates an example of metadata information that can be recorded in the metadata datastore 112. In FIG. 1B, a distributed object-based datastore 150 includes a plurality of data objects that are identified by object keys (e.g., /d1/k1, /d1/k2, /d1/k3, /d1/k4, /d1/k5) that are each mapped to the data/contents/values (e.g., numerical values, data strings, data files, multimedia files and/or encodings, memory addresses, and/or the like) of the objects. According to example embodiments, the data/contents/values of the data objects of the distributed object-based datastore 150 are segmented or divided into blocks. For example, a first data object identified as /d1/k1 has its contents divided into three blocks b1, b2, and b3 (e.g., data blocks, block portions). The various blocks of the data objects of the distributed object-based datastore 150 are distributed across the data nodes 110 that implement the distributed object-based datastore 150. As demonstrated in the illustrated example, a first data node 110A stores blocks {b1, b2, b3, b10}, a second data node 110B stores blocks {b4, b5}, and a third data node 110C stores blocks {b6, b7, b8, b9, b11, b12}.

In some embodiments, the distributed object-based datastore 150 is configured for data block sharing, where a given data block can store content portions of different data objects. In an illustrative non-limiting example of data block sharing, a first data object identified as /d1/k1 has its contents divided and stored at data blocks {b1, b2, b3}, a second data object identified as /d1/k2 has its contents divided and stored at data blocks {b2, b4, b6}. In this example, data block b2 is effectively shared by the first data object and the second data object.

According to example embodiments, the metadata for the distributed object-based datastore 150 includes block mapping information that describes the location of the blocks constituting the distributed object-based datastore 150. In the illustrated example, the metadata can indicate that block b1 is stored at the first data node 110A, block b4 is stored at the second data node 110B, and so on. In some embodiments, the metadata is configured in a key-value format, in which a given block is identified by a key, and the mapped value includes a network address, a unique identifier, and/or the like for the data node that stores the given block.

Accordingly, the metadata for the distributed object-based datastore 150 is used in operations for the distributed object-based datastore 150. For example, to access/read a data object of the distributed object-based datastore 150, the metadata is used to locate (and retrieve) the contents of the data object from a data node specified by the metadata.

II. Example Techniques for Snapshotting/Imaging Distributed Object-Based Datastores As referred to herein, a snapshot or snapshot image of a datastore is a collection of data that reflects the state of a datastore at or near a particular point in time. In particular, a snapshot image reflects the state of at least one portion of the datastore, for example, with respect to multiple data objects in an object-based datastore. Snapshot images are useful for data protection and disaster recovery when handling crashes, errors, and faults of a datastore; a snapshot image of the datastore for a recent point in time can be used to restore the datastore to the recent point in time that is prior to a crash, error, or fault of the datastore. Snapshot images are also useful to handle client requests to access, read, or view historical states of data recorded in the datastore, or of the datastore itself.

Snapshot features and features related to point-in-time imaging, while available for various file-based storage systems, have not been well-defined for object-based storage systems. While some object-based storage systems can support versioning of individual objects, object versioning is distinct from datastore snapshots, which capture multiple objects in the datastore taken atomically together. For example, object versioning does not efficiently enable data protection and disaster recovery as datastore snapshotting does, given that different objects may have different versions not aligned to a particular point in time.

According to example embodiments, snapshots of a distributed object-based datastore, such as a distributed object-based datastore implemented in the environment 100 described with FIG. 1A, are created and maintained for use based on instantiating a metadata datastore associated with the distributed object-based datastore, or creating separate directories of the metadata datastore associated with corresponding timepoints and representing snapshot images. The metadata datastore records, in a set of metadata files, metadata information for the objects included in the distributed object-based datastore, and in particular, information describing the division of a given object into data blocks and the distribution of data blocks in memory at one or more data nodes (e.g., block mapping information). The separate instantiation of the metadata datastore preserves the metadata information for the object at a particular timepoint, thus representing a snapshot of the distributed object-based datastore at the particular timepoint based on snapshotting the metadata information of the distributed object-based datastore at the particular timepoint. This separate instantiation of the metadata datastore can be accessed, read, used, and/or the like to handle various snapshot-related operations specifying the particular timepoint.

Among other benefits, the techniques described herein enable efficient and effective data management for a distributed, cloud computing environment. For example, the creation, maintenance and usage of snapshot images facilitate export, cloning, restoration and other data operations to increase data quality and availability with minimal impact on existing workloads. Further, example embodiments cooperate with the scalability of distributed object-based datastores, by enabling flexible snapshotting of entire data volumes, or individual data buckets, or of specified groups of data objects (e.g., specified via object key prefixes).

Figure 2:
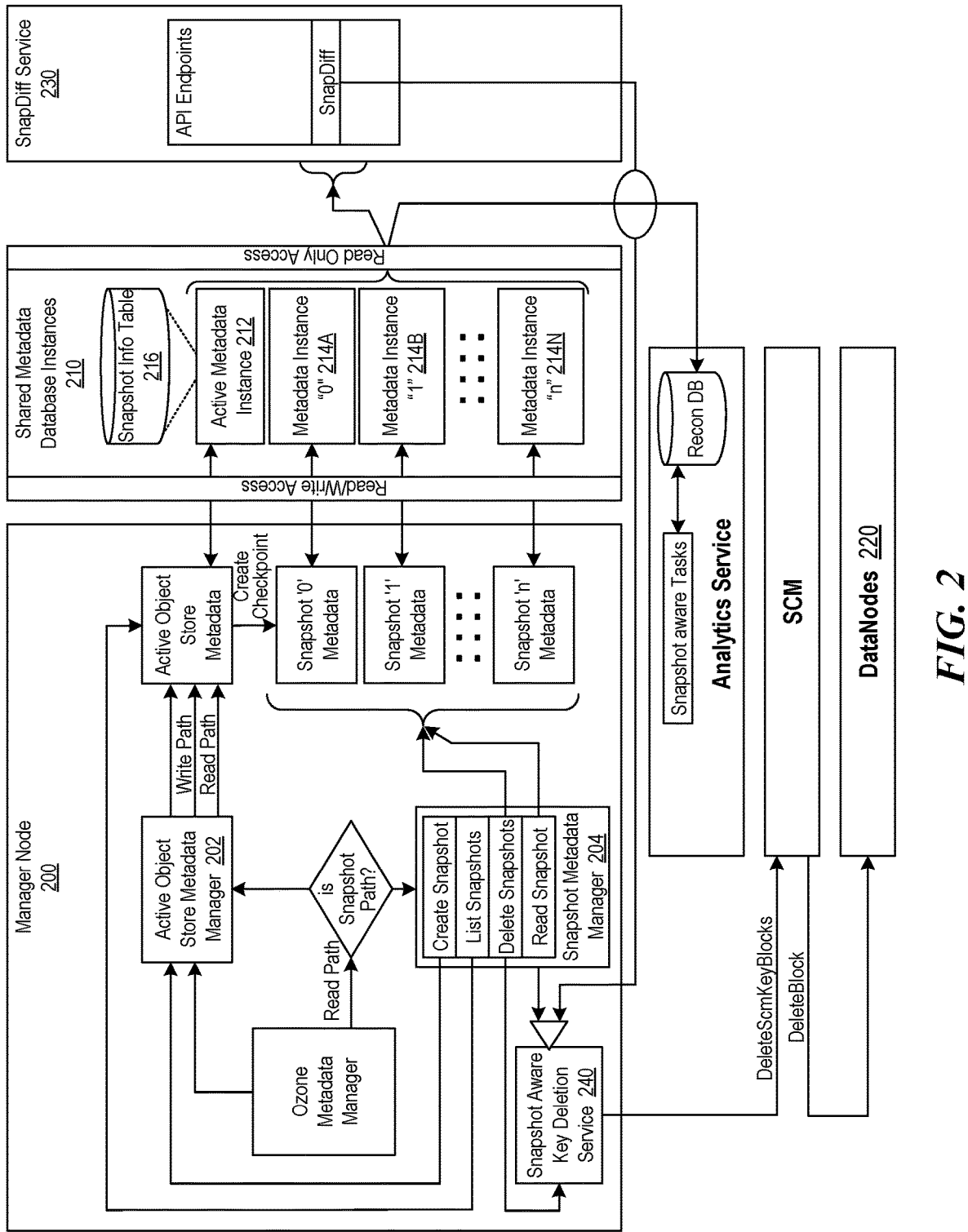
FIG. 2 is a block diagram that illustrates an example system for providing snapshotting or point-in-time imaging for a distributed object-based datastore.

FIG. 2 is a block diagram that illustrates an example system for enabling snapshotting for a distributed object-based datastore. As illustrated, a manager node 200 performs various operations to enable snapshot imaging for a distributed object-based datastore based on interfacing with a metadata datastore, and in particular with shared metadata database instances 210 of the metadata datastore. The shared metadata database instances 210 can be located at separate directories and can reference a different set of metadata files. The share metadata database instances 210 reference metadata files on which metadata information for the distributed object-based datastore is recorded. The distributed object-based datastore is implemented across the data nodes 220, and the metadata information identify the location of data blocks of data objects of the distributed object-based datastore at the data nodes 220. As discussed, the data blocks at the data nodes 220 are maintained in a read-only state. Thus, modification of data object values results in an object key of a data object being mapped to new data blocks at the data nodes 220. Previous values and current values of a data object can be captured by different sets of data blocks at the data nodes 220.

In some embodiments, the shared metadata database instances 210 includes a first instance 212, which is an active instance or directory that dynamically references metadata datastore entries on which current metadata information is recorded. The first instance 212 captures metadata information that reflects the current state of the distributed object-based datastore, for example including block mapping information that accurately describes the distributed storage of the data objects in the distributed object-based datastore and the values of the data objects. For example, the first instance 212 adds references or hard-links to metadata files that record active or current metadata information while dynamically removing references or hard-links to old metadata files. In an example: based on a user operation that modifies the contents of a given data object, the object key for the given data object is mapped to a new set of data blocks and is no longer mapped to a previous set of data blocks (by way of an append-only architecture of the distributed object-based datastore). The mapping of the object key to the new set of data blocks is recorded on a new metadata file, while a metadata file already existing in the metadata datastore records a now non-active mapping of the object key to the previous set of data blocks. In a dynamic manner, the first instance 212 of the metadata datastore adds or includes a reference to the new metadata file and removes its reference to the already-existing metadata file. In some embodiments, the first instance 212 is dynamically updated automatically and in response to the distributed object-based datastore modifying the key-block mappings.

The shared metadata database instances 210 further include other instances 214A, 214B, . . . , 214N that each reference a set of metadata files that reflected the state of the distributed object-based datastore at a previous timepoint. Each of the other instances 214A, 214B, . . . , 214N can be read-only and un-editable/immutable, thus preserving the metadata information that reflects a previous state of the distributed object-based datastore. Each of the shared metadata instances 210 is lightweight due to linking to or referencing the metadata files (rather than instantiating copies of the metadata files).

The other instances 214A, 214B, . . . , 214N represent the snapshot images of the distributed object-based datastore and can be instantiated, created, generated by example operations performed by the manager node 200. In some embodiments, the manager node 200 includes an active metadata manager 202 and a snapshot metadata manager 204. The active metadata manager 202 manages the first instance 212 of the shared metadata database instances 210, or the instance reflecting the current state (or the current metadata information/configuration) of the distributed object-based datastore. Accordingly, the active metadata manager 202 handles read/write activity on active data objects included in the distributed object-based datastore. The snapshot metadata manager 204 manages the other instances 214A, 214B, . . . , 214N of the shared metadata database instances 210, for example, at least one of the creation, deletion, analysis, and access of the other instances 214A, 214B, . . . , 214N.

In some embodiments, the active metadata manager 202 is configured to create snapshot images, delete snapshot images, and communicate such creations or deletions via the replication/consensus layer with other manager nodes 200 (to cause the other manager nodes 200 to perform similar snapshot-related operations). In order to create a snapshot image, the active metadata manager 202 can flush all updates and transactions so far, generate a new instance of the metadata datastore (e.g., via native snapshot imaging capabilities of the metadata datastore such as RocksDB Checkpoint), and update a snapshot list table 216 included in the first instance 212 (active instance). The snapshot list table 216 is a persistent table that records the existing snapshot images of the distributed object-based datastore. Table 1 below illustrates an example of an entry in the snapshot list table 216.

TABLE 1

| Snapshot Path/Mask | SnapshotInfo{ Snapshot Identifier (e.g., a universally unique identifier (UUID)) Name (e.g., a lexicographic identifier) Snapshot Status {Active, Deleted, Reclaimed} Creation time Deletion time Previous Snapshot-ID for the same Snapshot Path/Mask Previous Snapshot-ID in the global create sequence Snapshot Mask {same as Snapshot Path} Location (e.g., directory address) Miscellaneous Info } |
|---|---|

The snapshot path/mask included in an entry of the snapshot list table 216 represents the portion of the distributed object-based datastore that is captured by the snapshot image. For example, the portion can be an entire data volume, a data bucket within a data volume, a group of data objects identified by a common key prefix, key string portions, and/or the like. Accordingly, the snapshot path/mask can be a path specifying a data volume, a path specifying a bucket, a path specifying a key prefix, and/or the like.

When creating a snapshot image, the scope of the snapshot image (whether an entire volume, a bucket, a key prefix, and/or the like) can be specified with the snapshot path/mask, which is later added to the snapshot list table 216 as demonstrated above. While a snapshot image can include extraneous metadata files that potentially do not include metadata information relevant to the specific scope or portion of the distributed object-based database, this inclusion is acceptable. In particular, a snapshot image as an instance of the metadata datastore includes references or hard links to the metadata files, and are therefore lightweight in size. Further, with the snapshot path/mask associated with the snapshot image, the extraneous metadata files included in the snapshot image are easily ignored. In some embodiments, a background thread or process removes, deletes, or cleans up the extraneous metadata files from the snapshot images.

As indicated in Table 1 above, the snapshot list table 216 further records a snapshot creation order or a snapshot chain, indicating a sequential order in which multiple snapshot images are created. According to example embodiments, the snapshot creation order is specified in at least two ways. In particular, a first previousSnapshotID specifies a preceding snapshot image in the snapshot creation order that specifies the same portion of the distributed object-based datastore. For example, both snapshot images (a given snapshot image and the preceding snapshot image correspondingly specified in the snapshot list table 216) are associated with the same snapshot path/mask. A second previousSnapshotID specifies a preceding snapshot image that is agnostic of the specified portion of the distributed object-based datastore. That is, the second previousSnapshotID specifies the immediately preceding snapshot image in the snapshot creation order irrespective or without consideration of respective snapshot paths/masks. Recording the snapshot creation chain, for example via identifying preceding snapshot images for each snapshot image, enables efficient techniques for object key deletion/reclamation, snapshot image deletion, snapshot comparison, and other techniques described herein.

When deleting a snapshot image, the active metadata manager 202 pushes the deletion as a replication/consensus transaction so other manager nodes 200 are caused to delete corresponding snapshot images created respectively. Because the snapshot images are instances or directories of the metadata datastore that reference or hard-link to metadata files, the deletion of a snapshot image does not result in the deletion of the metadata files themselves.

In some embodiments, the snapshot metadata manager 202 is also configured to create and delete snapshot images, as shown in FIG. 2. The snapshot metadata manager 202 can also be responsible for maintaining the snapshot creation order recorded in the snapshot list table 216, for example, by iterating through entries in the snapshot list table 216 to update the identification of preceding snapshot images in response to the creation or deletion of other snapshot images.

The manager node 200 includes the active metadata manager 202 and the snapshot metadata manager 204 and selectively recruits one of the active metadata manager 202 or the snapshot metadata manager 204 to fulfill or handle a client request. A client request can specify, via a path included in the request, an active state of the distributed object-based datastore or a particular snapshot image of the distributed object-based datastore. For example, FIG. 2 illustrates that the manager node 200 determines whether a path included in a client request is a snapshot path or not, and accordingly forwards the request to be handled by either the active metadata manager 202 or the snapshot metadata manager 204. A snapshot path can specify a particular identifier of a snapshot image (e.g., an incrementing globally or universally unique identifier, a timepoint). An example of a snapshot path can be /volume1/bucket1/.snapshot/snapshotid/k1, which identifies a data object named k1 as captured in a particular snapshot image. In contrast, the data object k1 in its active or present state can be accessed or specified by a normal path such as /volume1/bucket1/k1.

As illustrated in FIG. 2, the snapshot metadata manager 204 can interface with the other instances 214A, 214B, . . . , 214N according to various snapshot-related operations. For a List Snapshots operation, the snapshot metadata manager 204 can return a listing of the snapshot images, a creation time of the snapshot images, identifiers of the snapshot images, and/or the like. The snapshot metadata manager 204 can obtain this information from the snapshot list table 216.

In some embodiments, the snapshot metadata manager 204 is further configured to restore a snapshot image. The snapshot metadata manager 204 can support in-place restoration of a snapshot image as well as remote restoration, or restoration of the snapshot image at a new location. Because snapshot images can be specified by a snapshot path (e.g., /.snapshot/snapshotid/volume1), the snapshot path can be used to copy a snapshot image to a new location. For example, a command/request for remote restoration of a snapshot image can be specified as cp-R snapshot-location target-location. For in-place restoration, or restoring the snapshot image into an active version of the distributed object-based datastore, a snapshot comparison technique can be used to determine the applicable differences between the snapshot image and the active or current state of the distributed object-based datastore. Those applicable differences can then be efficiently restored into the distributed object-based datastore.

As shown in FIG. 2, the snapshot comparison technique can be implemented as a snapshot comparison service 230 (e.g., "SnapDiff Service"), or implemented at a separate computing system or system module. Additional details on example embodiments of a snapshot comparison service 230 or snapshot comparison system are included herein.

As further illustrated in FIG. 2, the manager node 200 implements a snapshot-aware object/key deletion service 240. The snapshot-aware object/key deletion service 240 is configured to reclaim data objects currently stored in the data nodes 220 that are no longer relevant to the distributed object-based datastore or its snapshot images. For example, a data object deleted from the distributed object-based datastore can have its data blocks deleted, if not needed for any of the snapshot images of the distributed object-based datastore. Deletion of the data object and the associated data blocks represents the reclamation of the object key; the lexicographic key is free for use to name another data object. As another example, a data object mapped to new data blocks can have its previous data blocks deleted, if not needed for any of the snapshot images of the distributed object-based datastore.

While a data object can be reclaimed if the data object is not referenced by the active object store (e.g., the first instance 212 of the metadata datastore) and any of the snapshot images (e.g., the other instances 214A, 214B, . . . , 214N), it is inefficient to walk through the entire keyspace of every snapshot image and the active object store to identify reclaimable data objects/object keys. In some embodiments, the metadata datastore and its instances (e.g., the active object store, the snapshot images) each include a deleted key table that identifies the object keys specified or queued for deletion by a client system. The snapshot-aware key deletion service 240 leverages the snapshot creation order or snapshot chain, as well as the deleted key table in each snapshot image, to efficiently and safely identify reclaimable data objects/object keys.

In some embodiments, the snapshot-aware key deletion service 240 evaluates the following conditions to determine whether a given object key is reclaimable. The following conditions are described with respect to an example snapshot chain of $\{ActiveOS\text{-}>S_{recent}\text{-}>S_{next}\text{-}>S_{first}\}$ for object keys included in the deleted key table of ActiveOS, and it will be understood that the following conditions are applicable to different snapshot chains and to any snapshot image along the snapshot chain.

1) If Key is in the deleted key table of ActiveOS and no snapshot images exist, Key can be reclaimed.
2) If Key is in the deleted key table of ActiveOS and if Key is not included in the next snapshot image in the chain (e.g., $S_{recent}$) or its deleted key table, then Key can be reclaimed.
2.a) Conversely, if the next snapshot image in the chain (e.g., $S_{recent}$) includes Key, then Key is in use, and the snapshot-aware key deletion service 240 determines not to reclaim Key.
2.b) Conversely, if the Key is included in the deleted key table of the next snapshot image in the chain (e.g., $S_{recent}$->DeletedKeys), it is unknown at what point the Key moved to the deleted key table in the chain, and it is possible that Key is in use by some snapshot image down the chain. Key would be eventually reclaimed when the snapshot images that include Key are deleted. In some embodiments, there is no need to walk down the snapshot chain to greedily reclaim every deleted key right away. In some embodiments, the snapshot-aware key deletion service 240 walks down the chain in The keys included in the deleted key table of $S_{next}$ need to be reclaimed, and the conditions specified above for key reclamation can be evaluated first. It is possible that these deleted keys were present only during the lifetime of $S_{next}$ and are not referenced in the next snapshot image in the chain ($S_{first}$).

Next, keys that could be reclaimed from $S_{next}$ after it is deleted are considered. Identification of such keys is demonstrated through the example of Table 2 below.

TABLE 2

| Diff($S_{next}$, $S_{recent}$) | $S_{recent}$ | $S_{next}$ | $S_{first}$ | Diff($S_{next}$, $S_{first}$) | Evaluation |
|---|---|---|---|---|---|
| | | | K1 | Ignore set | Used by downstream |
| | | | K2 | | snapshots only |
| Candidate Set | | K3 | K3 | | Not used by upstream |
| | | K5 | K5 | | snapshots, still used by |
| | | | | | downstream snapshots |
| | K6 | K6 | K6 | | Used by both upstream and |
| | K8 | K8 | K8 | | downstream snapshots |
| | K9 | K9 | | Candidate Set | Not used by downstream |
| | K10 | K10 | | | snapshots, still used by |
| | K11 | K11 | | | upstream snapshots |
| Ignore Set | K12 | | | | Used by upstream snapshots |
| | K14 | | | | only |
| | K15 | | | | |
| Candidate Set | | K16 | | Candidate Set | Reclaimable set = |
| | | K17 | | | Diff($S_{next}$, $S_{first}$) ∩ |
| | | K18 | | | Diff($S_{next}$, $S_{recent}$) | a background thread or process to identify the specific snapshot image(s) in the chain that includes Key.

3) Key is a lexicographic identifier for a data object, which is also identified by a globally or universally unique identifier (GUID or UUID) (e.g., a numerical identifier). Key is mapped to the unique identifier for the data object in each snapshot image and active object store. If Key is in the deleted key table of ActiveOS and is included in the next snapshot image in the chain (e.g., $S_{recent}$), and if the unique identifier mapped to Key in ActiveOS is different than the unique identifier mapped to Key in $S_{recent}$, then Key in the deleted key table (or the data object identified by the unique identifier mapped to Key within ActiveOS) can be reclaimed.

4) If Key is in the deleted key table of ActiveOS and is included in the deleted key table of the next snapshot image in the chain (e.g., $S_{recent}$), and if the unique identifiers mapped to Key in ActiveOS and $S_{recent}$ are different, then Key can be reclaimed.

Deletion of entire snapshot images, similar to the above-described deletion of data objects/object keys, relies upon the snapshot creation order. Deletion of a snapshot image can be performed by the active metadata manager 202 and/or the snapshot metadata manager 204. Example techniques are performed to ensure any key that should have been deleted and reclaimed are not leaked.

To demonstrate a deletion of a snapshot image, consider an example with a snapshot chain of {ActiveOS-> $S_{recent}$->$S_{next}$->$S_{first}$}, in which $S_{next}$ is specified for deletion.

It should be noted that, while Table 2 identifies the keys in each of the snapshot images, keys are considered identical when their corresponding object identifiers (e.g., a GUID, a UUID) match. Otherwise, the keys identify different data objects with the same "name" or key. As demonstrated in Table 2, the set of reclaimable keys in a deleted snapshot image is the intersection of a first set of different keys between the deleted snapshot image and the preceding snapshot image in the chain ($S_{first}$) and a second set of different keys between the deleted snapshot image and the subsequent snapshot image in the chain ($S_{recent}$). The same evaluation of reclaimable keys in a deleted snapshot image can be reached by the key reclamation conditions described herein.

In some embodiments, the reclamation of data objects/ object keys can be delayed. For example, a key can be reclaimed immediately, but before the key deletion thread picks it up, a snapshot image is taken, and the key gets locked up in the snapshot image's deleted key table. Table 3 below illustrates this example scenario.

TABLE 3

| Time Seq | Snapshot ID | Operation | KeyTable State | Deleted Key Table State |
|---|---|---|---|---|
| 1 | | Create/d1/k1 | {/d1/k1:oid = 123} | { } |
| 2 | | Delete/d1/k1 | { } | {/d1/k1:oid = 123} |
| 3 | S2 | | { } | {/d1/k1:oid = 123} |
| => | ActiveOS | | { } | {/d1/k1:oid = 123} |

As seen from Table 3, a technical challenge arises with the key /d1/k1 being locked up because snapshot image S2 was created before the key deletion thread could complete the reclamation/deletion of key /d1/k1. The following techniques can overcome this technical challenge.

1) Eventually, this key will be reclaimed when snapshot image S2 is deleted. Essentially, keys will only be reclaimed from the active instance of the metadata datastore. However, this can lead to locking up of a significant amount of memory. Consider an example of 5000 operations/second, with an operation mix of 75% reads and 25% updates. If 5% of the updates are deletes, there are 75 deletes per second. Over two minutes, there are 9000 keys that cannot be deleted. With an average object size of 1 MB, a total of 9 GB of data is temporarily locked in a snapshot image. This can be addressed with the next solution.

2) The key deletion service picks up keys for reclamation from snapshot images as well as the active instance of the metadata datastore. This may require traversing the deleted key table of every snapshot image in the snapshot creation chain, despite most of the key not being reclaimable.

According to example embodiments, the reclamation and deletion of data objects/object keys can further account for deleted between snapshot image S2 and the active instance. In particular, via the snapshot comparison service 230 for example, the snapshot-aware key deletion service 240 determines that the object key /d1/k1 is included in the key table of a previous snapshot image. Accordingly, the snapshot-aware key deletion service 240 determines that the object key /d1/k1 is in use and cannot be immediately reclaimed. Further, the snapshot-aware key deletion service 240 can determine which previous snapshot images include the object key /d1/k1 and determine to reclaim the object key /d1/k1 when those previous snapshot images are deleted. In some examples, based on determining that the object key /d1/k1 is included in the key table of a previous snapshot image, the snapshot-aware key deletion service 240 can skip checking the deleted key tables of the previous snapshot images for the object key /d1/k1.

Example Scenario 2: A key is in used by the deleted key table of previous snapshot images. See Table 4B.

TABLE 4B

| Time Seq | Snapshot ID | Operation | KeyTable State | Deleted Key Table State |
|---|---|---|---|---|
| 0 | | Create/d1/k1 | {/d1/k1:oid = 123} | { } |
| 1 | S1 | | {/d1/k1:oid = 123} | { } |
| 2 | | Delete/d1/k1 | { } | {/d1/k1:oid = 123} |
| 3 | S2 | | { } | {/d1/k1:oid = 123} |
| 4 | | | { } | {/d1/k1:oid = 123} |
| => | Active Instance | | { } | {/d1/k1:oid = 123} | renaming (e.g., re-keying) of data objects. As discussed above, a key table that maps an object key to a unique identifier (e.g., a GUID, a UUID) of the data object that the object key identifies can be used to account for key renaming. The following example scenario further demonstrate the techniques performed by the snapshot-aware key deletion service 240 for the safe reclamation of object keys. In particular, the snapshot-aware key deletion service 240 implements robust techniques that safely reclaim object keys, in each of the example scenarios described.

Example Scenario 1: A key is in use by previous snapshot images. See Table 4A.

In this example scenario, the snapshot-aware key deletion service again determines whether object key /d1/k1 is reclaimable, based on determining whether the object key /d1/k1 is in use by any of the previous snapshot images (e.g., included in the key table and/or included in the deleted key table). According to a first check (e.g., via the snapshot comparison service 230), the snapshot-aware key deletion service 240 determines that the object key /d1/k1 is not included in the key table of snapshot image S2. According to a second check, the snapshot-aware key deletion service 240 determines the object key /d1/k1 is included in the deleted key table of snapshot image S2, thus preventing the

TABLE 4A

| Time Seq | Snapshot ID | Operation | KeyTable State | Deleted Key Table State |
|---|---|---|---|---|
| 0 | | Create/d1/k1 | {/d1/k1:oid = 123} | { } |
| 1 | S1 | | {/d1/k1:oid = 123} | { } |
| 2 | | | | |
| 3 | S2 | | {/d1/k1:oid = 123} | { } |
| | | Delete/d1/k1 | { } | {/d1/k1:oid = 123} |
| => | Active Instance | | { } | {/d1/k1:oid = 123} |

In order to determine whether the object key /d1/k1 (mapped to unique object identifier oid=123) can be reclaimed, the snapshot-aware key deletion service 240 determines whether the object key /d1/k1 is in use by any of the previous snapshot images (e.g., snapshot image S1 and snapshot image S2). In some embodiments, rather than traversing the keyspace in each previous snapshot image, the snapshot-aware key deletion service 240 can query the snapshot comparison service 230 to compare a previous snapshot image with the active instance of the metadata datastore. In the example scenario demonstrated in Table 4A, the snapshot comparison service 230 can return an indication that object key /d1/k1 is different and has been immediate reclamation of the object key /d1/k1. That is, by its inclusion in the deleted key table of snapshot image S2, the object key /d1/k1 may be in use by further previous snapshot images. Here, the snapshot-aware key deletion service 240 can conclude the evaluation of whether the object key /d1/k1 can be immediately reclaimed, in some embodiments.

In some embodiments, the snapshot-aware key deletion service 240 repeats these checks for each of the further previous snapshot images, in order to identify the specific snapshot images where the object key /d1/k1 is in use. By doing so, the snapshot-aware key deletion service 240 can schedule the later reclamation of the object key /d1/k1 in response to the deletion of those specific snapshot images, in some embodiments. For example, by continuing the checks to snapshot image S1, the snapshot-aware key deletion service 240 determines that the object key /d1/k1 is in use in snapshot image S1, and can schedule the reclamation of the object key /d1/k1 upon the deletion of at least snapshot image S1.

In some embodiments, the snapshot-aware key deletion service 240 is configured to either: (i) stop this reclamation evaluation upon one of the first check or the second check failing, or (ii) greedily continue the reclamation evaluation to identify the one or more snapshot images that prevent the reclamation of a given object key. In some embodiments, the snapshot-aware key deletion service 240 performs the greedy reclamation evaluation if the number of snapshot images is less than a predetermined threshold. In some embodiments, the snapshot-aware key deletion service 240 performs the greedy reclamation evaluation based on a current resource usage by the manager node 200 or of one or more computing nodes/systems implementing the snapshot-aware key deletion service 240.

Example Scenario 3: A object key is deleted and recreated. See Table 4C.

As discussed herein, the snapshot-aware key deletion service 240 evaluates each object key included in the deleted key table of the active instance of the metadata datastore for potential immediate reclamation. According to the described example techniques, the snapshot-aware key deletion service 240 determines that the object key /d1/k1 mapped to oid=123 cannot be immediately reclaimed, due to its inclusion in the deleted key table of snapshot image S2.

Also based on the described example techniques, the snapshot-aware key deletion service 240 determines that the object key /d1/k1 mapped to oid=456 can be immediately reclaimed. The snapshot-aware key deletion service 240 arrives at this determination based on the checks performed on the snapshot image S2. In particular, in some embodiments, the snapshot-aware key deletion service 240 need only determine that a given object key is not included in the key table nor included in the deleted key table of the most recent snapshot image (e.g., snapshot image S2) to determine that the given object key is immediately reclaimable.

TABLE 4C

| Time Seq | Snapshot ID | Operation | KeyTable State | Deleted Key Table State |
|---|---|---|---|---|
| 0 | | Create/d1/k1 | {/d1/k1:oid = 123} | { } |
| 1 | S1 | | {/d1/k1:oid = 123} | { } |
| 2 | | Delete/d1/k1 | { } | {/d1/k1:oid = 123} |
| 3 | | Create/d1/k1 | {/d1/k1:oid = 456} | {/d1/k1:oid = 123} |
| 4 | S2 | | {/d1/k1:oid = 456} | {/d1/k1:oid = 123 } |
| => | Active Instance | | {/d1/k1:oid = 456} | {/d1/k1:oid = 123} |

Again, the snapshot-aware key deletion service 240 determines whether the object key /d1/k1 is in use in the previous snapshot image (snapshot image S2) based on checking the key table and the deleted key table of the previous snapshot image. Similar to example scenario 2, the object key /d1/k1 is included in the deleted key table of snapshot image S2, thus stopping the snapshot-aware key deletion service 240 from reclaiming the object /d1/k1. Thus, the techniques performed by the snapshot-aware key deletion service 240 remain accurate with this example scenario involving recreation of object keys.

Example Scenario 4: An object key is deleted, recreated, and then deleted. See Table 4D.

This demonstrates that, when performing the checks of whether a given object key is included in the key table and/or the deleted key table of another snapshot image, the snapshot-aware key deletion service 240 refers to the unique object identifier mapped to the given object key. This prevents errors that may arise when object keys are recreated and/or renamed.

Example Scenario 5: An object key is renamed and deleted. See Table 4E.

TABLE 4D

| Time Seq | Snapshot ID | Operation | KeyTable State | Deleted Key Table State |
|---|---|---|---|---|
| 0 | | Create/d1/k1 | {/d1/k1:oid = 123} | { } |
| 1 | S1 | | {/d1/k1:oid = 123} | { } |
| 2 | | Delete/d1/k1 | { } | {/d1/k1:oid = 123} |
| 3 | S2 | | { } | {/d1/k1:oid = 123} |
| 4 | | Create/d1/k1 | {/d1/k1:oid = 456} | {/d1/k1:oid = 123 } |
| => | Active Instance | Delete/d1/k1 | { } | {/d1/k1:oid = 123; /d1/k1:oid = 456} |

TABLE 4E

| Time Seq | Snapshot ID | Operation | KeyTable State | Deleted Key Table State |
|---|---|---|---|---|
| 0 | | Create/d1/k1 | {/d1/k1:oid = 123} | { } |
| 1 | S1 | | {/d1/k1:oid = 123} | { } |
| 2 | | Rename/d1/k1 to/d1/k2 | {/d1/k2:oid = 123} | { } |
| 3 | | Delete/d1/k2 | { } | {/d1/k2:oid = 123} |
| => | Active Instance | | { } | {/d1/k2:oid = 123} |

Here, the described techniques performed by the snapshot-aware key deletion service 240 remain accurate in the event of key renaming. The object key /d1/k2 is examined for reclamation, and the snapshot-aware key deletion service 240 discovers that the object key /d1/k2 is included in a previous snapshot image (snapshot image S1), albeit under a different alias of the object key /d1/k1. As previously described, the snapshot-aware key deletion service 240 refers to the unique object identifiers mapped to object keys to determine matches. As such, the snapshot-aware key deletion service 240 is able to discover the inclusion of the unique object identifier oid=123 in the previous snapshot image S1, which prevents the immediate reclamation of the object key /d1/k2 mapped to the unique object identifier oid=123.

Example Scenario 6: An object key is renamed, renamed again, and then deleted. See Table 4F.

TABLE 4F

| Time Seq | Snapshot ID | Operation | KeyTable State | Deleted Key Table State |
|---|---|---|---|---|
| 0 | | Create/d1/k1 | {/d1/k1:oid = 123} | { } |
| 1 | S1 | | {/d1/k1:oid = 123} | { } |
| 2 | | Rename/d1/k1 to/d1/k2 | {/d1/k2:oid = 123} | { } |
| 3 | | Rename/d1/k2 to/d1/k3 | {/d1/k3:oid = 123} | { } |
| 4 | | Delete/d1/k3 | { } | {/d1/k3:oid = 123} |
| 5 | S2 | | { } | {/d1/k3:oid = 123} |
| => | Active Instance | | { } | {/d1/k3:oid = 123} |

In accordance with the described embodiments, the snapshot-aware key deletion service 240 determines that the object key /d1/k3 cannot be immediately reclaimed, due to its inclusion (with respect to unique object identifier mapped thereto) in previous snapshot images (in the deleted key table of snapshot image S2, in the key table of snapshot image S1).

Example Scenario 7: An object key is renamed and then recreated. See Table 4G.

Yet another example scenario that is appropriately handled by the snapshot-aware key deletion service 240 is demonstrated by Table 4G. When determining whether the object key /d1/k1 mapped to unique object identifier oid=456 can be reclaimed, the snapshot-aware key deletion service 240 determines that the object key /d1/k1 can be immediately reclaimed. Object key /d1/k1 can be immediately reclaimed despite appear in name in the previous snapshot image S1, because the object key /d1/k1 being evaluated and the object key /d1/k1 included in snapshot image S1 refer to different data objects in the distributed object-based datastore. Therefore, while object keys may be specified in deletion requests, the snapshot-aware key deletion service 240 relies upon unique object identifiers to accurately determine whether a data object (e.g., oid=456, oid=123) can be deleted/reclaimed.

Example Scenario 8: An object key is not reclaimed immediately but deferred until snapshot image deletion. See Table 4H.

TABLE 4G

| Time Seq | Snapshot ID | Operation | KeyTable State | Deleted Key Table State |
|---|---|---|---|---|
| 0 | | Create/d1/k1 | {/d1/k1:oid = 123} | { } |
| 1 | S1 | | {/d1/k1:oid = 123} | { } |
| 2 | | Rename/d1/k1 to/d1/k2 | {/d1/k2:oid = 123} | { } |
| 3 | | Create/d1/k1 | {/d1/k2:oid = 123;/d1/k1:oid = 456} | { } |
| 4 | | Delete/d1/k1 | {/d1/k2:oid = 123} | {/d1/k1:oid = 456} |
| => | Active Instance | | {/d1/k2:oid = 123} | {/d1/k1:oid = 456} |

TABLE 4H

| Time Seq | Snapshot ID | Operation | KeyTable State | Deleted Key Table State |
|---|---|---|---|---|
| 0 | S1 | | { } | { } |
| 1 | | Create/d1/k1 | {/d1/k1:oid = 123} | { } |
| 2 | | Delete/d1/k1 | { } | {/d1/k1:oid = 123} |
| 3 | S2 | | { } | {/d1/k1:oid = 123} |
| => | | Active Instance | { } | {/d1/k1:oid = 123} |

This example scenario demonstrates that, according to the described embodiments, it may be possible that the snapshot-aware key deletion service 240 incorrectly determines that a given object key should not be immediately reclaimed. This constitutes a false positive error by the snapshot-aware key deletion service 240. That said, according to the described embodiments, it may be preferred to unnecessarily delaying the reclamation/deletion of object keys.

This false positive error arises based on the snapshot-aware key deletion service 240 concluding its evaluation after checking the most recent snapshot image, and not continuing to check further snapshot images. In some embodiments, the demonstrated false positive error may not arise if the snapshot-aware key deletion service 240 performs its greedy reclamation evaluation, or if the snapshot-aware key deletion service 240 continues its reclamation evaluation to keys included in the deleted key tables of snapshot images. For example, subsequent to evaluating each key included in the deleted key table of the active instance of the metadata datastore, the snapshot-aware key deletion service 240 moves to the deleted key table of the next snapshot image in the chain to identify any keys that can be immediately reclaimed. In doing so, the snapshot-aware key deletion service 240 would realize that the object key /d1/k1 is not in use in the snapshot image S1 and can accordingly be reclaimed.

Thus, embodiments described herein provide various technical operations related to the operation and management of a distributed object-based datastore. By enabling instantaneous capture of point-in-time images of at least a portion of the distributed object-based datastore, described embodiments enable improved data protection and disaster recovery for the distributed object-based datastore. The embodiments described herein incorporate robustness and reliability of the snapshot or point-in-time images of the distributed object-based datastore by carefully considering whether portions of the distributed object-based datastore can be reclaimed or deleted without destroying a snapshot image. Example embodiments further improve user interactions with low latency high availability of snapshot functionality for the distributed object-based datastore. Client requests can be appropriately routed to manager nodes associated with the distributed object-based datastore, and the manager nodes each maintain consistent and accurate snapshot images of the distributed object-based datastore.

FIG. 3 is a flow diagram that illustrates example operations for creating and using snapshot images for a distributed object-based datastore. According to example embodiments, the example operations are performed by a computing node associated with the distributed object-based datastore, or a computing node belonging to a distributed computing system (e.g., a cloud-based computing platform) that implements the distributed object-based datastore. For example, the computing node is embodied by one of the manager nodes 108 described with FIG. 1A or the manager node 200 described with FIG. 2.

At 302, the computing node receives a snapshot request to create a snapshot image of at least one portion of a distributed object-based datastore for a particular timepoint. The at least one portion of the distributed object-based datastore can be an entire data volume, one or more data buckets within a data volume, a group of data objects identified by object keys with a common prefix, and/or the like.

At 304, the computing node creates a separate instance of a metadata datastore that is associated with the distributed object-based datastore to represent the snapshot image. The metadata datastore is configured according to an append-only and/or read-only architecture, such that updates to the metadata information represented by the metadata datastore are recorded on new metadata files added to the metadata datastore and not applied "in-place" to existing metadata files. For example, the metadata datastore is configured according to an LSM-based architecture. In some examples, the separate instance of the metadata datastore is a separate directory that references and links to a respective set of metadata files that represented the metadata information for the distributed object-based datastore at a particular point in time. The separate instance is distinct from an active instance of the metadata datastore that dynamically references and links to metadata files with the latest applicable metadata information.

At 306, the computing node uses the separate instance of the metadata datastore, instead of the active instance of the metadata datastore or other instances associated with different timepoints, to handle snapshot-related requests that specify the snapshot image for the particular timepoint, or that specify the particular timepoint. The snapshot-related requests can include restoring the snapshot image to the distributed object-based datastore or to a new location, reading or accessing data objects or portions of the snapshot image, deleting the snapshot image, comparing the snapshot image with another snapshot image or the active instance of the metadata datastore, and/or the like. The computing node can determine that a snapshot-related request specifies the snapshot image and/or the particular timepoint associated with the snapshot image based on the snapshot-related request including a snapshot path that specifies a snapshot namespace (e.g., /.snapshot/) and/or a snapshot identifier. With the separate instance referencing metadata files that record the mapping of object keys to data blocks at the particular timepoint, the computing node can use the separate instance and the referenced metadata files to identify and retrieve the data blocks that were (e.g., previously) associated with a given object key during the particular timepoint.

III. Example Techniques for Comparing Snapshot Images for Distributed Object-Based Datastores According to example embodiments described herein, an LSM architecture is leveraged to provide snapshot images of a distributed object-based datastore, where each snapshot image is an instance of an LSM database or directory that references a respective set of LSM structure entries or metadata files (e.g., SST files in a metadata datastore). For example, a first snapshot image references a first set of metadata files that records metadata information that was associated with the distributed object-based datastore at a first timepoint, while a second snapshot image references a different set of metadata files that records metadata information associated with the distributed object-based datastore at a second timepoint. It is desirable to enable comparisons between different snapshot images for a distributed object-based datastore. Reliable and accurate comparison techniques between different snapshot images enable improved disaster recovery and data protection, improved datastore analytics and information, and other technical benefits.

With snapshot images including references to a respective set of one or more LSM structure entries or metadata files, example techniques for snapshot comparison include identifying unique or different metadata files identified between two snapshot images, and traversing the object-level or key-level information recorded on the unique metadata files. As an illustrative non-limiting example, consider a first snapshot image that references three metadata files {A.sst, B.sst, C.sst} and a second snapshot image that references four metadata files {A.sst, B.sst, C.sst, D.sst}. For example, the three metadata files referenced by the first snapshot image describe the distributed object-based datastore at a first timepoint, and the inclusion of D.sst in the second snapshot image may reflect the addition of one or more data objects to the distributed object-based datastore, the modification of an existing data object (including objects identified in the other metadata files), and/or the like occurring between the first timepoint and a second timepoint with which the second snapshot image is associated.

According to example embodiments, a snapshot comparison system identifies D.sst as unique between the second snapshot image and the first snapshot image, or equivalently identifies A.sst, B.sst, C.sst as common, redundant, or non-unique between the second snapshot image and the first snapshot image. Thus, the snapshot comparison system examines and traverses the metadata information recorded on D.sst to generate comparison data that indicates object-level or key-level differences between the two snapshot images. Examples of object-level or key-level differences can include object key k1 being newly mapped to data blocks b3 and b4 at the second timepoint (as recorded on D.sst, for example) after being previously mapped to data blocks b1 and b2 at the first timepoint, object key k2 being re-named to object key k3 at the second timepoint, object key k4 being deleted, and/or the like. By concentrating on the unique metadata files or LSM structure entries between two snapshot images being compared, a snapshot comparison system can efficiently and quickly determine the comparison data and return the comparison data in response to a comparison request. Indeed, the size of the keyspace traversed by the snapshot comparison system to handle a comparison request can be reduced, in some examples, from ten billion object keys to a few hundred object keys.

In some embodiments, comparison data includes a listing of object keys in the distributed object-based datastore, including new object keys, object keys with modified values, deleted keys, and/or the like. In some embodiments, the comparison data further includes the data values associated with each of the object keys identified or listed in the comparison data. For example, given a data key with a modified value, the comparison data determined by the snapshot comparison system includes the original data value(s) and the new data value(s). In some embodiments, the comparison data at least includes the new data values associated with modified objects keys (and data values associated with new object keys).

LSM-based datastores, due at least to their append-only behavior, perform compactions to create fewer entries/files of individually larger sizes, these few entries/files capturing the information stored across many smaller entries/files. Referencing the above illustrative example, the LSM-based metadata datastore can store a new (e.g., post-compaction) E.sst file that records both the metadata information stored in pre-compaction files A.sst and B.sst at some point in time (e.g., upon request by a client, automatically according to a compaction schedule or policy). The metadata information of either pre-compaction file is not itself modified and is simply included with other metadata information in the single post-compaction file E.sst. Compaction can also aggregate or cumulate multiple modifications to a final state recorded on the post-compaction file. In another non-limiting illustrative example, A.sst records three sequential modifications to a given object key k1, or similarly A.sst indicates a number of intermediate states and a final state of the given object key k1. Following compaction, the post-compaction file E.sst that compacts at least A.sst can simply indicate the final state of the given object key k1. Again, however, the information indicated by E.sst (with respect to the given object key k1) is not different than the information indicated by A.sst (with respect to the given object key k1), but is simply cumulative—indeed, the given object key k1 takes the final state indicated by A.sst (and compacted into E.sst) at the point in time represented by A.sst.

While compactions improve the operation and management of the LSM-based metadata datastore(s) associated with a distributed object-based datastore, compactions can complicate the above-described techniques in which unique metadata files referenced by two snapshot images are identified in order to accelerate the determination of object-level or key-level differences between the two snapshot images. Indeed, with compaction, a given metadata file can represent the same or cumulative metadata information recorded on one or more other metadata files. In accordance with the above-described examples of compaction, consider a comparison of a first snapshot image that references {A.sst, B.sst, C.sst} and a second snapshot image that references {C.sst, D.sst, E.sst}. Given E.sst is the compaction of A.sst and B.sst, E.sst should not be identified as a unique metadata file in the second snapshot image and should not be traversed in order to efficiently determine the comparison data. Only D.sst need be traversed to determine the comparison data.

Accordingly, example techniques described herein further account for LSM compactions performed by the LSM-based metadata datastore when comparing LSM-based snapshot images. A snapshot comparison system monitors and detects compaction events occurring in the LSM-based metadata datastore, and in particular, records the pre-compaction metadata files or entries and the post-compaction metadata files or entries for each compaction event. In some embodiments, the snapshot comparison system records the pre-compaction and post-compaction files of a compaction event in a graph-based data structure, such as a directed acyclic graph, in which the pre-compaction files and the post-compaction files are associated or related to one another. When comparing two snapshot images, the snapshot comparison system refers to the graph-based data structure to at least determine whether any of the metadata files referenced by one of the two snapshot images are compactions of metadata files referenced by the other snapshot image, and are thus representing the same metadata information. The snapshot comparison system accordingly reduces the number of metadata files to traverse, or the size of the keyspace to traverse, and can efficiently determine the comparison data.

Figure 4:
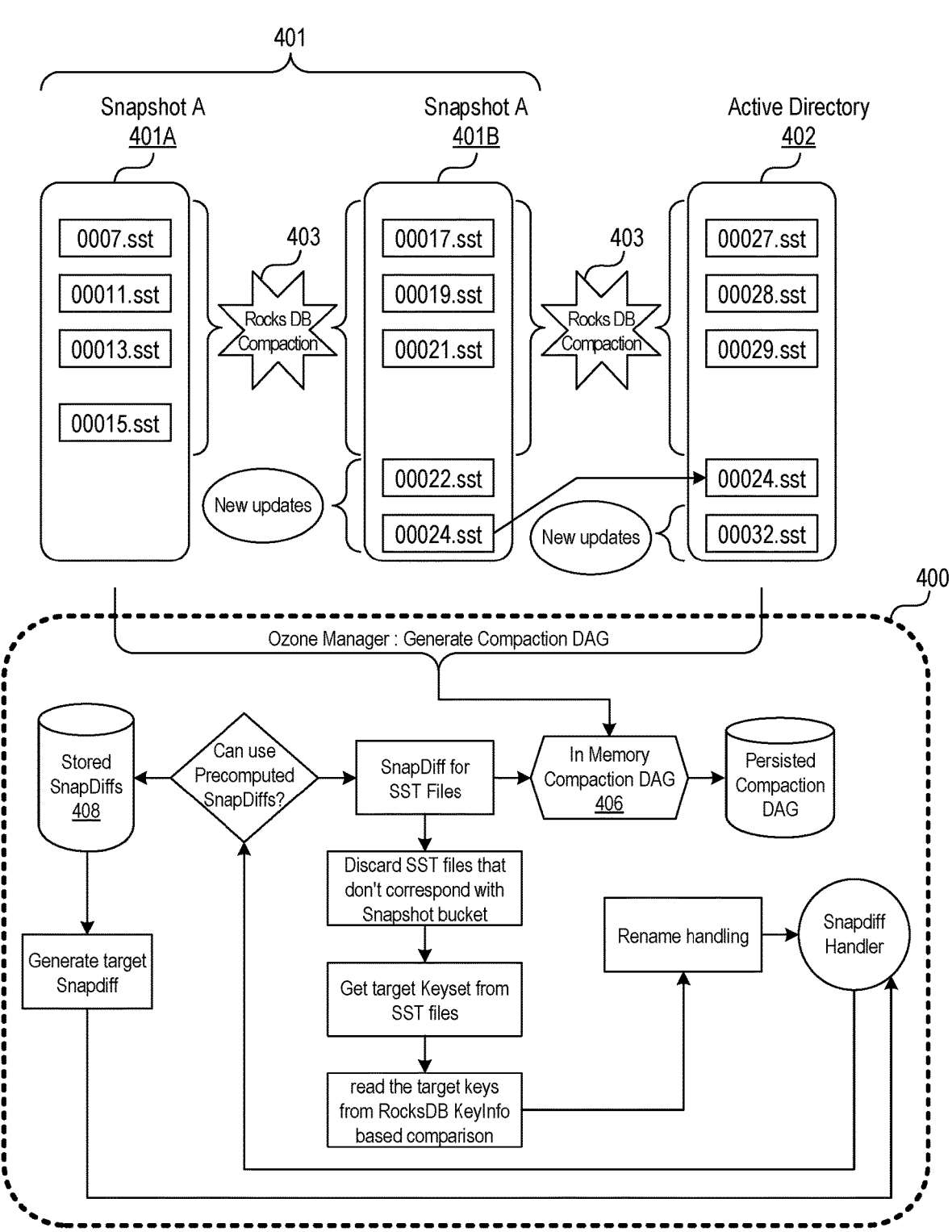
FIG. 4 is a block diagram that illustrates an example system for robustly comparing snapshots or point-in-time images of a distributed object-based datastore.

FIG. 4 is a block diagram that illustrates an example of a snapshot comparison system 400 configured to robustly compare snapshot images for a distributed object-based datastore. In some embodiments, the snapshot comparison system 400 is implemented as a service that can be requested or called by manager nodes of a distributed object-based datastore system. In some embodiments, the snapshot comparison system 400 is implemented by one or more manager nodes of a distributed object-based datastore system. The snapshot comparison system 400 is communicatively coupled with the metadata datastores of the distributed object-based datastore system in order to compare different snapshot images represented by instances of the metadata datastores. In some embodiments, the snapshot comparison system 400 is also communicatively coupled with the data nodes of the distributed object-based datastore system at which data objects (or block portions thereof) are stored such that the snapshot comparison system 400 determines comparison data that includes the data blocks or stored values of the data objects.

As illustrated in FIG. 4, snapshot images 401 (e.g., first snapshot image 401A and second snapshot image 401B) are instances of an LSM-based metadata directory, while another instance of the LSM-based metadata directory serves as an active directory 402 to dynamically reference to the metadata files with the latest applicable metadata information. Thus, according to example embodiments, snapshot comparison includes the comparison of different instances of the LSM-based metadata directory or metadata datastore. Compactions 403 can occur between the points in time represented by and captured in the snapshot images 401. As a result, in the illustrated example, metadata files 00017.sst, 00019.sst, and 00021.sst as referenced by the second snapshot image 401B are compactions of metadata files 0007.sst, 00011.sst, 00013.sst, and 00015.sst as referenced by the first snapshot image 401A. Outside of compactions 403, additional metadata files are added to the LSM-based metadata datastore in response to user operations with the distributed object-based datastore system, for example, to store new data objects, modify existing data objects, delete existing data objects, and/or the like. For example, the second snapshot image 401B includes metadata files 00022.sst and 00024.sst which originate from user operations and not from compactions 403. The relevant differences between snapshot images 401 to be captured in comparison data are recorded on these new metadata files that originate from user operations, and not on new metadata files that originate from compactions 403.

According to example embodiments, the snapshot comparison system 400 monitors and detects the compactions 403 occurring at the LSM-based metadata datastore. In some embodiments, the snapshot comparison system 400 receives or obtains compaction reports from the LSM-based metadata datastore that indicate, for each compaction 403, the pre-compaction metadata files (e.g., 0007.sst, 00011.sst, 00013.sst, 00015.sst) and the post-compaction metadata files (e.g., 00017.sst, 00019.sst, 00021.sst). The snapshot comparison system 400 can receive or obtain the compaction reports in real-time or within a predetermined window of time of the compactions 403. In some embodiments, the snapshot comparison system 400 includes or instantiates a synchronous event listener that is communicatively coupled with the LSM-based metadata datastore (or a notification application programming interface (API) provided by the LSM-based metadata datastore) such that the synchronous event listener receives notification messages indicating the compactions 403 and the relevant metadata files.

The synchronous event listener is configured to ensure that the snapshot comparison system 400 is informed of the compactions 403, even when the snapshot comparison system 400 has crashed, lost communication, and/or the like. In some embodiments, the LSM-based metadata datastore sends a callback to the synchronous event listener, which registers the event in stable storage (e.g., non-volatile memory express (NVME), disk storage) and provides a return message back to the LSM-based metadata datastore. Upon receipt of the return message, the LSM-based metadata datastore then considers the compaction event complete. If the return message is not received, for example due to a system crash or reboot of the synchronous event listener, the LSM-based metadata datastore considers the compaction event as incomplete and will send one or more subsequent messages to the synchronous event listener to attempt to complete the compaction event.

In some embodiments, the snapshot comparison system 400 generates or updates a graph-based data structure 406 that records the relationship or association between the pre-compaction files and the post-compaction files for each compaction 403. The graph-based data structure 406 can be persisted in memory, such that the graph-based data structure 406 can be retrieved or restored if needed to enable the efficient comparison techniques described herein. In some embodiments, the graph-based data structure 406 is stored in the active instance of the LSM-based metadata datastore, for example, to maintain read-write properties or access for the graph-based data structure 406 (other snapshot instances of the LSM-based metadata datastore may be configured as read-only). As such, the snapshot comparison system 400 is able to continue updating the graph-based data structure 406 to capture compaction events over time.

Figure 5A:
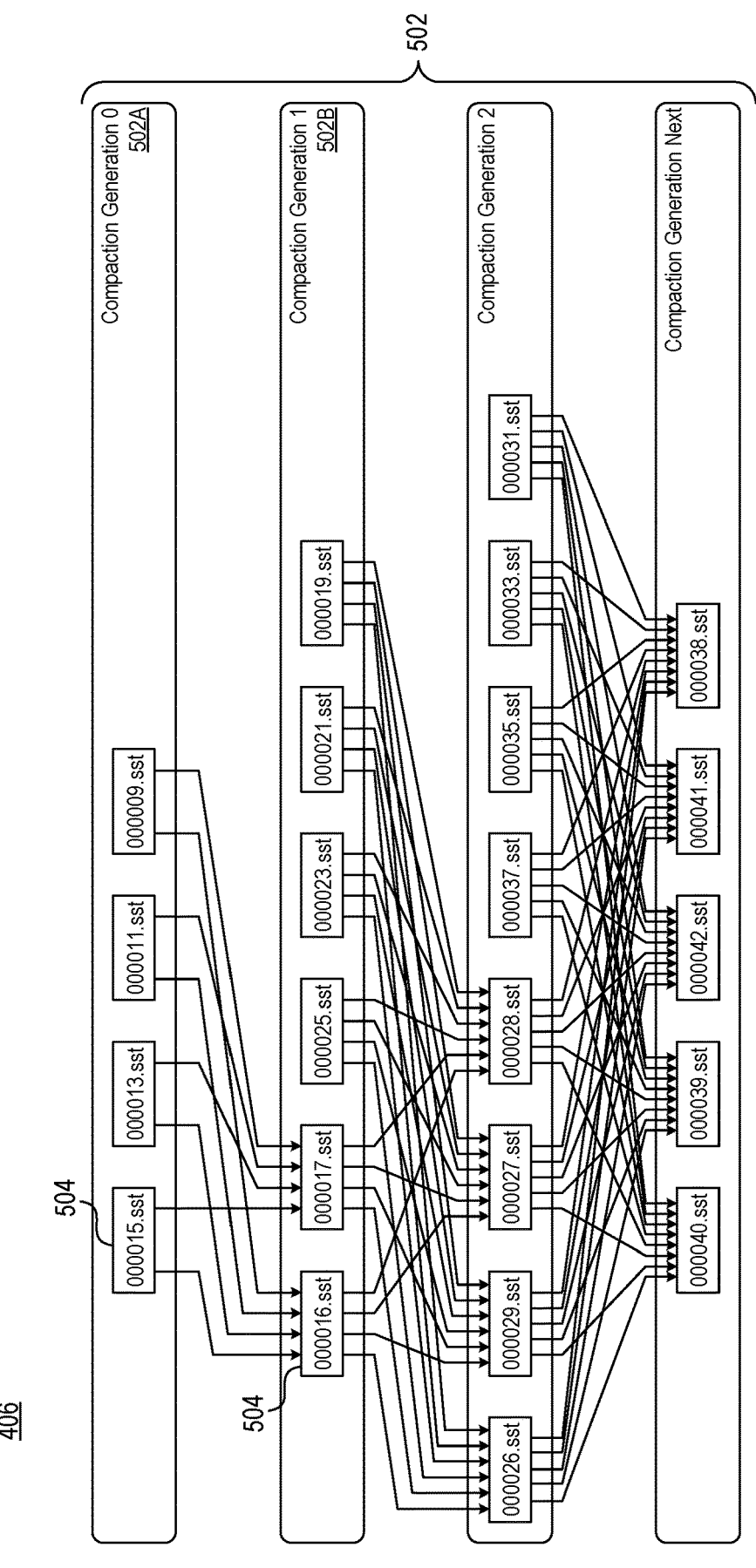
FIG. 5A illustrates an example of compactions of metadata information recorded in a metadata datastore associated with a distributed object-based datastore.

Turning to FIG. 5A, an example of the graph-based data structure 406 is illustrated. In some examples, the graph-based data structure 406 is configured as a directed acyclic graph (DAG), or another data structure that can maintain the relationship between input and output files of a compaction process. The graph-based data structure 406 includes a plurality of compaction generations 502, and each compaction generation 502 can represent a pre-compaction state before a compaction and/or a post-compaction state after a (different) compaction. In the illustrated example, a first compaction generation 502A reflects a state of the LSM-based metadata datastore prior to a compaction and the second compaction generation 502B reflects the state of the LSM-based metadata datastore following the compaction. The graph-based data structure 406 indicates one or more metadata files 504 in each compaction generation. The metadata files 504 indicated by the graph-based data structure 406 can be those involved in LSM compaction; for example, the metadata datastore may include other metadata files at the time of the first compaction generation 502A, which are not indicated in the graph-based data structure 406 due to not being compacted or resulting from compaction.

In response to a compaction, the snapshot comparison system 400 can add a new compaction generation to the graph-based data structure 406 to include the post-compaction files for the compaction. The snapshot comparison system 400 updates the graph-based data structure 406 to relate or associate the post-compaction files with the pre-compaction files, or files having information that is compacted and recorded on the post-compaction files. This relationship or association can be indicated as a directed relationship within the graph-based data structure 406. In the illustrated example, the graph-based data structure 406 indicates directed relationships from 000015.sst, 000013.sst, 000011.sst, and 000009.sst to 000016.sst and 000017.sst to indicate that 000015.sst, 000013.sst, 000011.sst, and 000009.sst were compacted into 000016.sst and 000017.sst.

Therefore, the snapshot comparison system 400 can reference the graph-based data structure 406 to determine compaction relationships, if any, between the metadata files of two given snapshot images in order to acceleration snapshot comparison. The compaction relationships between metadata files as determined from the graph-based data structure 406 can include compaction-downstream relationships and compaction-upstream relationships. To demonstrate, consider a first illustrative example in which a first snapshot image includes {000009.sst, 000011.sst, 000013.sst, 000015.sst} and a second snapshot image includes {000016.sst, 000017.sst, 000025.sst, 000023.sst, 000021.sst, 000019.sst}. The graph-based data structure 406 indicates that 000016.sst and 000017.sst are compaction-downstream, or resultant from a compaction, with respect to 000009.sst, 000011.sst, 000013.sst, and 000015.sst and can therefore be removed from consideration or evaluation when comparing the first snapshot image and the second snapshot image.

Consider a second illustrative example in which a first snapshot image includes {000009.sst, 000011.sst, 000013.sst} and a second snapshot image includes {000016.sst, 000017.sst, 000025.sst, 000023.sst, an example of metadata files 504 in snapshot images 506 being associated with one another to efficiently determine unique metadata files 508, and ultimately the comparison data. As illustrated, compaction relationships between metadata files 504 across consecutive snapshot images 506 (in a sequential creation order) can be leveraged to quickly identify the unique metadata files 508 between two snapshot images 506, even those snapshot images that are not consecutive or adjacent in the sequential creation order.

Therefore, snapshot images 506 can be created any time before and/or after compaction events and need not have all the files that comprise a compaction generation. The snapshot comparison system can walk the directed relationships in the graph-based data structure from graph nodes of the metadata files in a source snapshot image to the graph nodes of the metadata files in a destination snapshot image, and the snapshot comparison system can precisely calculate which metadata files are different. This can be done by identifying the metadata files in the source snapshot state that do not lead to the metadata files in the destination snapshot image, which can be done with a simple level order traversal of the graph-based data structure. Once the unique or different metadata files are identified, the keys in those metadata files can be quickly traversed and used as hints to determine the comparison data. By doing so, example embodiments maintain the invariant that it is not needed to iterate over more keys than the keyspace size of the object-based datastore. Table 5 below lists some examples of efficient comparisons between snapshot images enabled by the described techniques, according to the example graph-based data structure shown in FIG. 5A.

TABLE 5

| Destination Snapshot State | Source Snapshot State | Diff. Files |
|---|---|---|
| {38, 39, 40, 41, 42} | {26, 27, 28, 29, 31, 33, 35, 37} | |
| (38, 39, 40, 41, 42, 50, 51} | {26, 27, 28, 29, 31, 33, 35, 37} | {50, 51} |
| {38, 39, 40, 41, 42} | {26, 27, 28, 29, 31, 33, 35, 37, 50, 51} | Not Possible |
| {38, 39, 40, 41, 42} | {9, 11, 13} | {15, 19, 21, 23, 25, 31, 33, 35, 37} |

000021.sst, 000019.sst}. For example, the first snapshot image was created prior to the creation of 000015.sst and the compaction thereof resulting in the second compaction generation 502B. That is, the snapshot images may not necessarily correspond to compaction generations; compactions can occur interleaved or not between the creation of snapshot images. Based on the graph-based data structure 406, the snapshot comparison system can determine that, while not included in the first snapshot image, a file 000015.sst is compaction-upstream, or including pre-compacted information, of files 000016.sst and 000017.sst, along with the other files that are included in the first snapshot image. Accordingly, the snapshot comparison system can simply locate, retrieve, and/or traverse the file 000015.sst to determine the differences between the first snapshot image and at least files 000016.sst and 000017.sst referenced by the second snapshot image. That is, the file 000015.sst can be used instead of files 000016.sst and 000017.sst in this example to determine comparison data between the first snapshot image and the second snapshot image.

Figure 5B:
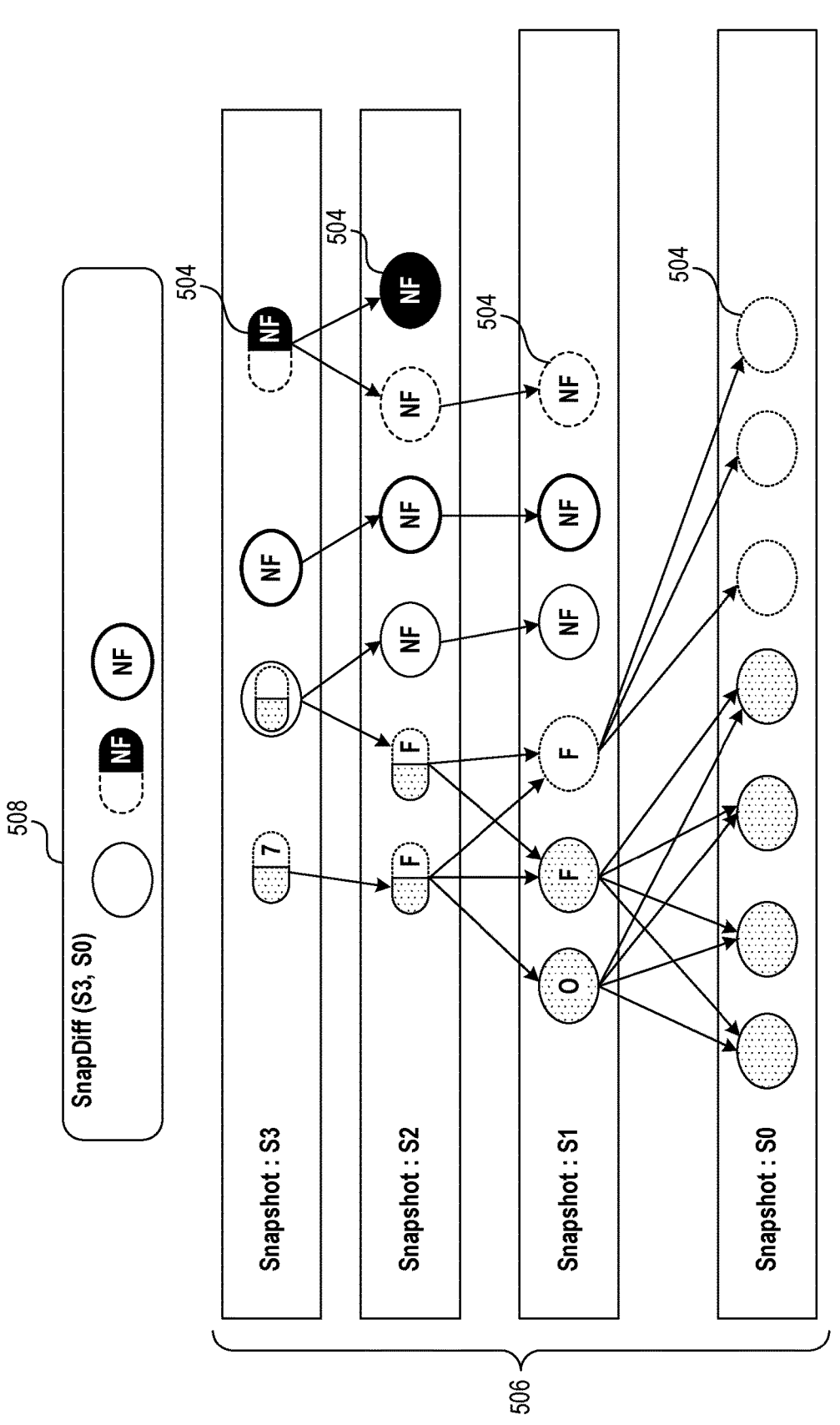
FIG. 5B illustrates examples of snapshots of a distributed object-based datastore for points in time that are interleaved with compactions performed by a metadata datastore associated with the distributed object-based datastore.

As demonstrated by at least these two illustrative examples, the graph-based data structure 406 can be walked in at least two different directions to efficiently select metadata files for generating comparison data. FIG. 5B illustrates As demonstrated, the snapshot comparison system can also determine impossibilities or inconsistencies in snapshot images using the graph-based data structure. In some embodiments, the snapshot comparison system calculates a total number of keys in the metadata files identified as different. If the total or cumulative number of keys in these metadata files is greater than the keyspace of the object-based datastore, a high degree of churn occurred between the two snapshot images, and the snapshot comparison system can determine to iterate over the entire keyspace of the object-based datastore instead to determine the comparison data.

In some embodiments, the graph-based data structure 406 includes references or hard links to the metadata files 504 involved in the compactions represented in the graph-based data structure 406. In some embodiments, the LSM-based metadata datastore is configured to delete or remove metadata files having a reference count below zero, or metadata files not being referenced or used. By way of the graph-based data structure 406 including references or hard links to the metadata files 504, the reference count for the metadata files 504 is kept at least at one. Thus, the graph-based data structure 406 actively prevents the deletion of certain metadata files that may be useful or that are needed for computing the comparison data. Indeed, a snapshot image may not have been created at a given compaction generation, and without the graph-based data structure 406 including a reference or hard link to the metadata files of the given compaction generation, the metadata files may not be preserved.

In some embodiments, the graph-based data structure 406 can be updated to remove portions thereof related to older compaction generations not support for snapshot comparison. In some embodiments, a snapshot comparison system implements a limit on the distance between snapshot images for comparison, with respect to a snapshot creation order. For example, the snapshot comparison system can set a maximum distance between snapshot images at one hundred, thus preventing a comparison between snapshot image number 10 and snapshot image number 111 (numbered according to a snapshot creation order). Accordingly, the snapshot comparison system can prune, remove, or delete compaction generations in the graph-based data structure 406 that correspond to compactions occurring a point in time when snapshot image number 10 was created.

As mentioned herein, the snapshot comparison system can determine an estimated size of a snapshot comparison, or the cumulative number of keys in unique files across the two snapshot images to be traversed. In some embodiments, the snapshot comparison system compares the estimated size of a given snapshot comparison with a configurable threshold parameter, and based on the estimated size failing to satisfy the configurable threshold parameter, the snapshot comparison system can return an error in response to a comparison request that initiated the given snapshot comparison. In some examples, the configurable threshold parameter can be a configured percentage of the total keyspace of the distributed object-based datastore, an absolute number of object keys, and/or the like. In some embodiments, the snapshot comparison system uses the estimated size of the given snapshot comparison to determine when to complete or perform the given snapshot comparison. For example, the snapshot comparison system schedules the given snapshot comparison with respect to predicted resource usage by the snapshot comparison system and/or the computing system(s) implementing the snapshot comparison system.

Additionally or alternatively to estimated comparison sizes, the snapshot comparison system can determine a comparison distance based on creation time of the two snapshot images, based on sequential creation order of the two snapshot images, and/or the like. The snapshot comparison system can include configurable threshold parameters for such comparison distances and determine whether to return an error, schedule the snapshot comparison, adjust resource usage or consumption by the snapshot comparison system, and/or the like. For example, the snapshot comparison system is configured to return an error for comparison requests that specify two snapshot images created more than a week apart. As another example, the snapshot comparison system is configured to return an error for comparison requests that specify two snapshot images between which more than fifty other snapshot images were created.

Referring back to FIG. 4, the snapshot comparison system 400 is configured to store comparison data so that the comparison data can be leveraged and used in subsequent requests for similar comparisons. In some embodiments, the snapshot comparison system 400 includes a comparison database 408 (or a snapshot-comparison database as referred to herein) in which the comparison data determined/generated by the snapshot comparison system 400 is stored. The comparison data (e.g., a listing of different object keys, a dataset including the different object keys and corresponding data values) is stored in the comparison database 408 in association with the pair of two snapshot images that the comparison data compares. For example, the comparison database 408 identifies the two snapshot images associated with a set of comparison data based on identifiers associated with the two snapshot images (e.g., sequential identifiers, globally or universally unique identifiers).

In some embodiments, the comparison database 408 is included within the active directory 402 or an active instance of the LSM-based metadata datastore that dynamically indicates a present state of the distributed object-based datastore. In some embodiments, the comparison data is a file, and the comparison database 408 associate a key based on the two snapshot images (e.g., as hash of the respective identifiers of the two snapshot images, a concatenation of the respective identifiers of the two snapshot images) with a file location of the comparison data file. The snapshot comparison system 400 can delete entries in the comparison database 408 and/or comparison data files in response to the deletion of either one of the two snapshot images of a given entry or comparison data file. In some embodiments, a manager node of the distributed object-based datastore that implements the snapshot comparison system 400 can share comparison data files with other manager nodes, for example, via a replication/consensus layer.

The comparison data stored by the snapshot comparison system 400 can be used to efficiently handle comparison requests that specify a pair of snapshot images that have already been compared. When receiving a comparison request, the snapshot comparison system 400 references the comparison database 408 to determine whether any stored comparison data is associated with the same pair of snapshot images. Based on the pair of snapshot images being associated with comparison data already stored in the comparison database 408, the snapshot comparison system 400 can quickly and efficiently handle the comparison request.

In some examples, the snapshot comparison system 400 can leverage stored comparison data when a comparison request specifies a different pair of snapshot images. For example, if a specified pair of snapshot images is cumulative of two pairs of snapshot images for which comparison data is stored, the respective sets of comparison data corresponding to the two pairs of snapshot images are combined to generate new comparison data for the specified, cumulative pair of snapshot images. As an illustrative non-limiting example, consider that the comparison database 408 stores a first entry of comparison data that compares Snapshot 5 and Snapshot 8, and a second entry of comparison data that compares Snapshot 8 and Snapshot 10. For a comparison request that specifies a comparison between Snapshot 5 and Snapshot 10, the first entry and the second entry of comparison data be combined to arrive at the differences between Snapshot 5 and Snapshot 10.

Further, in some examples, the determination of comparison data can be accelerated if at least one of the specified snapshot images in the comparison request is associated with stored comparison data. Consider another illustrative non-limiting example in which the comparison database 408 stores an entry of comparison data that compares Snapshot 3 and Snapshot 9. Given a comparison request that specifies a comparison between Snapshot 3 and Snapshot 10, the snapshot comparison system 400 can opt to generate new comparison data between Snapshot 9 and Snapshot 10, which may be less resource-intensive and span less object keys than the specified comparison between Snapshot 3 and Snapshot 10. The snapshot comparison system 400 can then combine the new comparison data between Snapshot 9 and Snapshot 10 with the stored comparison data between Snapshot 3 and Snapshot 9, in order to arrive at the specified comparison between Snapshot 3 and Snapshot 10. This technique can overcome technical challenges associated with comparing snapshot images that are far apart in time and churn.

As described herein, multiple manager nodes of a distributed object-based datastore system can be implement respective metadata datastores, which are kept consistent via replication/consensus techniques. In some embodiments, in response to receiving a comparison request from a given manager node, the snapshot comparison system 400 uses the corresponding metadata datastore to provide comparison results.

In some embodiments, each manager node has an independent scheduling for running compactions of respective metadata datastores. Thus, the set of metadata files in a first metadata datastore used by a first manager node can diverge from the set of metadata files in a second metadata datastore used by a second manager node, even though both sets of metadata files represent the same information. This implies that the graph-based data structure could be different for different manager nodes and respective metadata datastores. Accordingly, the snapshot comparison system 400 stores a respective graph-based data structure 406 within a metadata datastore, or the active instance thereof.

In some examples, a new follower node of the manager nodes inherits all instances of the metadata datastore as well as the graph-based data structure indicating compactions from a leader node of the manager nodes. In some embodiments, a follower node can lag behind a leader node based on missing replication/consensus transactions, and the follower node updates its own respective graph-based data structure when compactions occur for its metadata datastore. In some embodiments, the follower node that has missed one or more snapshot images can use comparison data from other nodes of the manager nodes to retroactively create the one or more snapshot images from an active state of the metadata datastore.

FIG. 6 is a flow diagram that illustrates example operations for robustly comparing snapshot images of a distributed object-based datastore. In some embodiments, the snapshot comparison system 400 or a snapshot comparison service performs the example operations.

At 602, the snapshot comparison service detects compaction events performed by or occurring at an LSM-based metadata datastore that stores metadata files for data objects included in the distributed object-based datastore. Each compaction event results in first metadata files (e.g., pre-compaction files) stored in the LSM-based metadata datastore being compacted into one or more new metadata files (e.g., post-compaction files) added to the LSM-based metadata datastore. Each snapshot image of the distributed object-based datastore references a respective set of the metadata files stored in the LSM-based metadata datastore.

At 604, the snapshot comparison service maintains a graph-based data structure, such as a directed acyclic graph (DAG), that indicates, for each compaction event, a relationship between the first metadata files and the new metadata files.

At 606, the snapshot comparison service receives a request to compare a first snapshot image of the distributed object-based datastore and a second snapshot image of the distributed object-based datastore. In some embodiments, the snapshot comparison service receives the request from a manager node of a distributed object-based datastore system via an application programming interface (API) provided by the snapshot comparison service.

At 608, the snapshot comparison service identifies unique metadata files between the first snapshot image and the second snapshot image. According to some examples, the unique metadata files are identified based on filename or identifier differences among the files referenced by the first snapshot image and the second snapshot image. In particular, the unique metadata files can be identified based on filename or identifier differences if no compactions were performed between the first snapshot image and the second snapshot image. In some examples, the unique metadata files are identified using the graph-based data structure to track compactions occurring between the respective timepoints of the first snapshot image and the second snapshot image. Accordingly, metadata files in either snapshot image that redundantly represent the same metadata information pre- and post-compaction can be filtered out, and metadata files that are non-redundant can be identified.

At 610, the snapshot comparison service generates the comparison data based on the unique metadata files. Each of the unique metadata files can indicate the addition of data objects (represented by object keys), the modification of data objects (represented by a new mapping of an object key to different object blocks), the deletion of data objects, and/or the like. Thus, the unique metadata files are traversed to generate object-level comparison data. In some examples, the number of keys indicated in the unique metadata files is less than a total keyspace of the distributed object-based datastore. At 612, the snapshot comparison service returns the comparison data in response to the request, for example, via the API to the manager node(s) of the distributed object-based datastore system.

IV. Example Implementation of a Computing System

Figure 7:
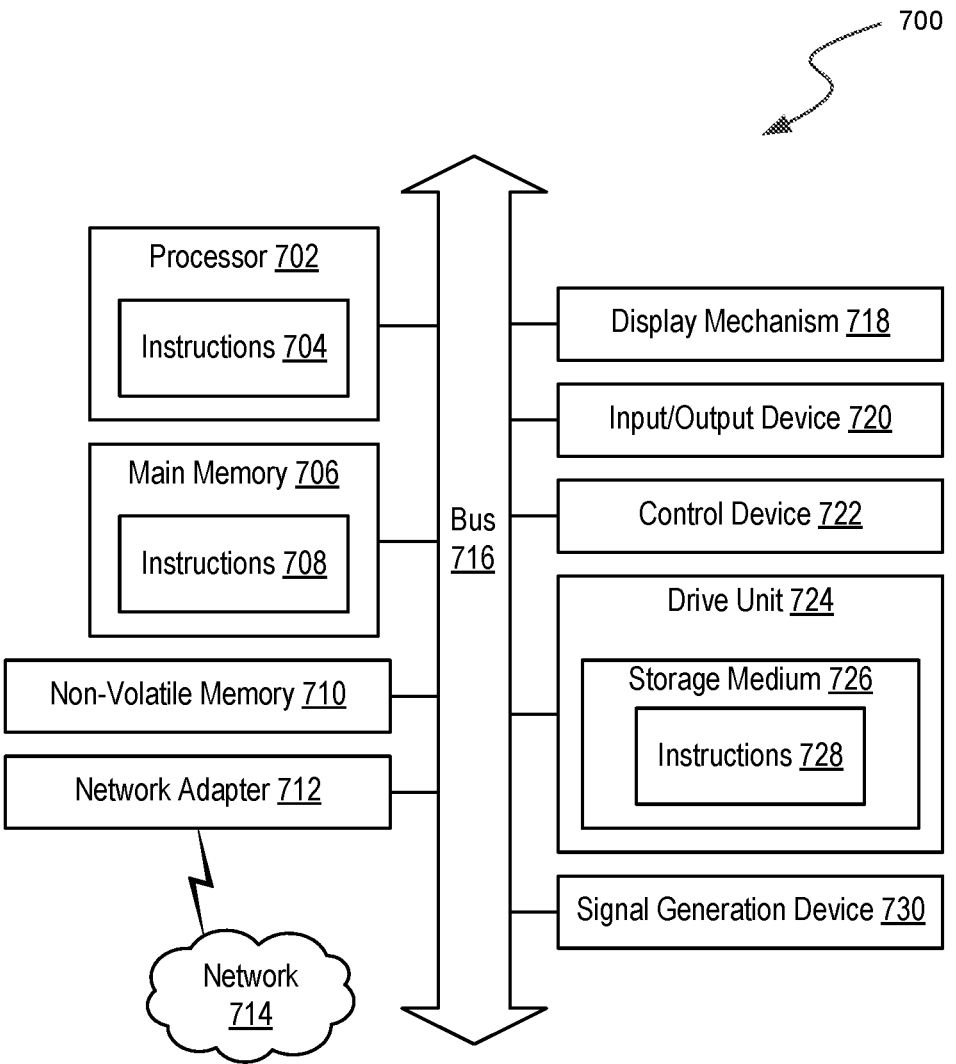
FIG. 7 is a block diagram that illustrates an example of a computer system in which at least some operations described herein can be implemented.

FIG. 7 is a block diagram illustrating an example of a computing system 700 in which at least some of the operations described herein can be implemented. For example, the computing system 700 implements one of multiple manager node of a distributed object-based datastore. In some embodiments, the computing system 700, when implementing one given manager node, receives routed requests from client systems located near the computing system 700. For example, the distributed object-based datastore implements the multiple manager nodes at different computing systems, including the computing system 700, at different locations, such that the manager nodes are available at low latency to client systems located at various locations. As another example, the computing system 700 implements a snapshot comparison service with which manager nodes of the distributed object-based datastore interface. In some embodiments, the computing system 700 that implements the snapshot comparison service is independent of a computing system, a group of computing systems, and/or a computing platform that implements the manager nodes of the distributed object-based datastore system and/or the distributed object-based datastore system itself. As such, the snapshot comparison service can scale independently of the manager nodes and service loads separately from the manager nodes.

The computing system 700 may include a processor 702, main memory 706, non-volatile memory 710, network adapter 712, display mechanism 718, input/output device 720, control device 722, drive unit 724 including a storage medium 726, or signal generation device 730 that are communicatively connected to a bus 716. Different combinations of these components may be present depending on the nature of the computing device in which the computing system 700 resides. The bus 716 is illustrated as an abstraction that represents one or more physical buses or point-to-point connections that are connected by appropriate bridges, adapters, or controllers. Thus, the bus 716 can include a system bus, a Peripheral Component Interconnect ("PCI") bus or PCI-Express bus, a HyperTransport or industry standard architecture ("ISA") bus, a small computer system interface ("SCSI") bus, a universal serial bus ("USB"), inter-integrated circuit ("I2C") bus, or an Institute of Electrical and Electronics Engineers ("IEEE") standard 1394 bus (also called "Firewire").

While the main memory 706, non-volatile memory 710, and storage medium 726 are shown to be a single medium, the terms "machine-readable medium" and "storage medium" should be taken to include a single medium or multiple media (e.g., a centralized or distributed database and associated caches and computer servers) that store one or more sets of instructions 728. The terms "machine-readable medium" and "storage medium" shall also be taken to include any medium that is capable of storing, encoding, or carrying instructions for execution by the computing system 700.

In general, the routines executed to implement embodiments of the present disclosure may be implemented as part of an operating system or a specific computer program. A computer program typically comprises instructions (e.g., instructions 704, 708, 728) set at various times in various memory and storage devices in a computing device. When read and executed by the processor 702, the instructions cause the computing system 700 to perform operations in accordance with aspects of the present disclosure.

Further examples of machine- and computer-readable media include recordable-type media, such as volatile memory devices and non-volatile memory devices, removable disks, hard disk drives, and optical disks (e.g., Compact Disk Read-Only Memory ("CD-ROMs") and Digital Versatile Disks ("DVDs")), and transmission-type media, such as digital and analog communication links.

The network adapter 712 enables the computing system 700 to mediate data in a network 714 with an entity that is external to the computing system 700 through any communication protocol supported by the computing system 700 and the external entity. The network adapter 712 can include a network adaptor card, a wireless network interface card, a router, an access point, a wireless router, a switch, a multi-layer switch, a protocol converter, a gateway, a bridge, a bridge router, a hub, a digital media receiver, a repeater, or any combination thereof.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments can vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A distributed object-based datastore system comprising:

an object datastore implemented across a plurality of distributed data nodes, the object datastore including a plurality of data objects that are each stored at one or more data blocks at one or more of the plurality of distributed data nodes;

a metadata datastore configured to be instantiable and to store metadata for the plurality of data objects of the object datastore, the metadata including block mapping information that identifies one or more given data blocks for a given data object, wherein a first instance of the metadata datastore includes active block mapping information that is modifiable to identify the one or more given data blocks at which the given data object is stored at a current timepoint; and a manager node configured to create snapshot images of the object datastore, the manager node implemented by at least one computing device comprising at least one processor and at least one memory storing instructions that, when executed by the at least one processor, perform operations of the manager node, wherein the operations comprise:

receiving a snapshot request to generate a snapshot image of at least one portion of the object datastore for a specified timepoint, wherein the specified timepoint is a temporal identifier of an instance of the metadata datastore, instantiating, based on the specified timepoint, a second instance of the metadata datastore using the first instance of the metadata datastore, the second instance preserving a read-only copy of the active block mapping information that was included in the first instance at the specified timepoint, wherein the second instance of the metadata datastore represents the snapshot image for the specified timepoint, generating a snapshot chain indicating a sequential order of creation for a plurality of snapshot images for the object datastore, wherein the plurality of snapshot images includes the snapshot image, and wherein the snapshot chain indicates, for the snapshot image, (1) a location-agnostic preceding snapshot image from the object datastore and (2) a location-agnostic subsequent snapshot image from the object datastore, receiving a deletion request to delete the snapshot image, subsequent to deleting the snapshot image, (1) generating a first set of different object keys based on a first set of object keys associated with the snapshot image and a second set of object keys associated with the location-agnostic preceding snapshot image and (2) generating a second set of different object keys based on the first set of object keys and a third set of object keys associated with the location-agnostic subsequent snapshot image, wherein an object key is a lexicographic identifier that names a particular data object and that is reclaimable upon deletion of the particular data object and a set of data blocks associated with the particular data object, and generating a set of reclaimable object keys by determining an intersection of the first set of different object keys and the second set of different object keys.

2. The distributed object-based datastore system of claim 1, wherein the metadata datastore is a log-structured merge-tree (LSM) data structure in which a modified version of the metadata for the plurality of data objects is recorded as a separate data entry from a data entry recording a previous version of the metadata, and wherein the first instance includes a particular set of data entries that records the active block mapping information.

3. The distributed object-based datastore system of claim 1, wherein the manager node includes an active metadata manager and a snapshot metadata manager, and wherein the operations further comprise:

receiving an access request that identifies, via a data path, one or more data objects stored in the object datastore; and based on determining whether the data path specifies a particular snapshot image of the object datastore, select one of the active metadata manager or the snapshot metadata manager to obtain particular metadata for retrieving the one or more data objects.

4. The distributed object-based datastore system of claim 1, wherein at least one of the location-agnostic preceding snapshot image or the location- agnostic subsequent snapshot image also captures the at least one portion of the object datastore.

5. The distributed object-based datastore system of claim 1, wherein at least one of the location-agnostic preceding snapshot image or the location-agnostic subsequent snapshot image captures a different portion of the object datastore.

6. The distributed object-based datastore system of claim 1, wherein the object datastore is divided into a plurality of buckets each associated with a subset of the plurality of data objects, and wherein the at least one portion of the object datastore includes data objects belonging to one or more buckets of the plurality of buckets.

7. The distributed object-based datastore system of claim 1, wherein each data object of the object datastore is identified by a lexicographic key, and wherein the at least one portion of the object datastore includes a set of data objects having respective lexicographic keys with a common prefix indicated by the snapshot request.

8. The distributed object-based datastore system of claim 1, further comprising an object deletion service configured to remove certain data objects from the object datastore based on the certain data objects not being identified in the first instance of the metadata datastore or in any snapshot image of the metadata datastore.

9. The distributed object-based datastore system of claim 8, wherein the object deletion service is configured to determine whether a particular data object is identified in a particular snapshot image based on searching a respective block mapping information of the particular snapshot image for a unique identifier associated with a lexicographic key assigned to the particular data object.

10. The distributed object-based datastore system of claim 1, wherein the second instance of the metadata datastore is instantiated at a plurality of high-availability nodes that uses a consensus protocol to maintain identical copies of the second instance across the plurality of high-availability nodes.

11. The distributed object-based datastore system of claim 1, wherein the operations further comprise:

performing a snapshot-comparison operation with two snapshot images of the object datastore in order to perform at least one of: a compaction of the object datastore, or a restore a particular snapshot image.

12. A distributed computer system comprising:

a plurality of data nodes communicatively coupled with one another and implementing an object-based datastore for a plurality of object keys, wherein an object key is a lexicographic identifier that names a particular data object and that is reclaimable upon deletion of the particular data object and a set of data blocks associated with the particular data object;

a metadata database configured to be instantiable and to store map data for the object-based datastore, the map data locating respective data blocks for a given object key of the object-based datastore; and one or more manager nodes configured to perform operations comprising:

in response to a first access request that specifies a particular object key for an active timepoint, using a first instance of the metadata database to locate the respective data blocks for the particular data object key at the active timepoint, wherein the first instance is configured to be modifiable to update a respective map data for a present timepoint;

in response to a snapshot request for a snapshot timepoint, wherein the snapshot timepoint is a temporal identifier of a second instance of the metadata database, instantiating, based on the snapshot timepoint, the second instance of the metadata database using the first instance of the metadata database, the second instance preserving a read-only copy of the first instance at the snapshot timepoint, wherein the second instance represents a snapshot image of the object-based datastore for the snapshot timepoint;

in response to a second access request that specifies the particular object key for the snapshot timepoint, using the second instance of the metadata database to locate the respective data blocks that were associated with the particular object key at the snapshot timepoint;

receiving a deletion request to delete the snapshot image;

subsequent to deleting the snapshot image, (1) generating a first set of different object keys based on a first set of object keys associated with the snapshot image and a second set of object keys associated with a preceding snapshot image from a snapshot chain and (2) generating a second set of different object keys based on the first set of object keys and a third set of object keys associated with a subsequent snapshot image from the snapshot chain; and generating a set of reclaimable object keys by deter-
mining an intersection of the first set of different
object keys and the second set of different object
keys.

13. The distributed computer system of claim 12, wherein
the metadata database is further configured to include, for
each instance of the metadata database, a deleted key table
that indicates certain object keys flagged for deletion from
the object-based datastore at a respective timepoint, and
wherein the operations further comprise:

determining to remove a certain object key from the
object-based datastore based on traversing the deleted
key table for at least two instances of the metadata
database.

14. The distributed computer system of claim 12, wherein
the second instance of the metadata database is associated
with a path mask that identifies a portion of the object-based
datastore captured within the snapshot image.

15. The distributed computer system of claim 14, wherein
the second instance of the metadata database includes:

(i) a first reference for identifying a first preceding snap-
shot image also associated with the path mask, and (ii) a second reference for identifying a second preceding
snapshot image that immediately precedes the second
instance in a snapshot creation sequence.

16. The distributed computer system of claim 14, wherein
the second access request specifies the snapshot timepoint
based on including a path that satisfies the path mask of the
second instance of the metadata database.

17. The distributed computer system of claim 12, wherein
the operations further comprise:

restoring the object-based datastore to a previous state
during the snapshot timepoint based on performing a
comparison between the first instance of the metadata
database and the second instance of the metadata
database.

18. A computer-implemented method comprising:

generating, by one or more computing nodes of a distrib-
uted computing platform, a plurality of instances of an
instantiable metadata datastore associated with an
object-based datastore, wherein (i) a first instance of the
instantiable metadata datastore is configured to
dynamically identify distributed data blocks that are
mapped to object keys of the object-based datastore at
a present timepoint, and (ii) one or more other instances
of the instantiable metadata datastore each configured
to preserve a read-only copy of the first instance at a
respective timepoint prior to the present timepoint, receiving, by the one or more computing nodes, an access
request that specifies a particular object key and a
particular timepoint, wherein the particular timepoint is
a temporal identifier of an instance of the instantiable
metadata datastore, and wherein the particular time-
point is different than the present timepoint;

based on the particular timepoint, selecting, by the one or
more computing nodes, a particular instance of the one
or more other instances of the instantiable metadata
datastore that is associated with the particular time-
point;

handling, by the one or more computing nodes, the access
request based on using the particular instance of the
instantiable metadata datastore to locate the distributed
data blocks that were mapped to the particular object
key during the particular timepoint;

receiving a deletion request to delete the particular
instance of the instantiable metadata datastore;

subsequent to deleting the particular instance of the
instantiable metadata datastore, (1) generating a first set
of different object keys based on a first set of object
keys associated with the particular instance of the
instantiable metadata datastore and a second set of
object keys associated with a preceding instance of the
instantiable metadata datastore and (2) generating a
second set of different object keys based on the first set
of object keys and a third set of object keys associated
with a subsequent instance of the instantiable metadata
datastore; and generating a set of reclaimable object keys by determining
an intersection of the first set of different object keys
and the second set of different object keys.

19. The distributed computer system of claim 12, wherein
the snapshot chain indicates a sequential order of creation
for a plurality of snapshot images for the object-based
datastore, wherein the plurality of snapshot images includes
the snapshot image, wherein the preceding snapshot image
is a location-agnostic preceding snapshot image from the
object-based datastore, and wherein the subsequent snapshot
image is a location-agnostic subsequent snapshot image
from the object-based datastore.

20. The computer-implemented method of claim 18,
wherein the particular instance of the instantiable metadata
datastore, the preceding instance of the instantiable metadata
datastore, and the subsequent instance of the instantiable
metadata datastore are included in a snapshot chain indicat-
ing a location-agnostic sequential order of creation for the
plurality of instances of the instantiable metadata datastore.

* * * * *